US011464022B2

(12) United States Patent
Yun et al.

(10) Patent No.: US 11,464,022 B2
(45) Date of Patent: Oct. 4, 2022

(54) METHOD AND APPARATUS FOR TRANSMITTING PPDU IN WLAN SYSTEM

(71) Applicant: LG ELECTRONICS INC., Seoul (KR)

(72) Inventors: Sunwoong Yun, Seoul (KR); Jinmin Kim, Seoul (KR); Eunsung Park, Seoul (KR); Dongguk Lim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 17/268,395

(22) PCT Filed: Sep. 18, 2019

(86) PCT No.: PCT/KR2019/012033
§ 371 (c)(1),
(2) Date: Feb. 12, 2021

(87) PCT Pub. No.: WO2020/060172
PCT Pub. Date: Mar. 26, 2020

(65) Prior Publication Data
US 2021/0204299 A1   Jul. 1, 2021

(30) Foreign Application Priority Data
Sep. 19, 2018  (KR) .................. 10-2018-0112516

(51) Int. Cl.
*H04W 72/08*  (2009.01)
*H04L 27/26*  (2006.01)
(Continued)

(52) U.S. Cl.
CPC ....... *H04W 72/085* (2013.01); *H04L 27/2603* (2021.01); *H04L 27/2607* (2013.01); *H04W 72/0453* (2013.01); *H04W 84/12* (2013.01)

(58) Field of Classification Search
CPC ............. H04L 27/2602; H04L 27/2603; H04L 27/2607; H04L 5/0023; H04L 5/0016;
(Continued)

(56) References Cited

U.S. PATENT DOCUMENTS

| 2016/0119047 | A1* | 4/2016 | Lee ....................... H04W 48/16 370/329 |
| 2016/0315681 | A1 | 10/2016 | Moon et al. |

(Continued)

FOREIGN PATENT DOCUMENTS

| KR | 20120085253 | 7/2012 |
| WO | 2016039535 | 3/2016 |
| WO | 2017069589 | 4/2017 |

OTHER PUBLICATIONS

PCT International Application No. PCT/KR2019/012033, International Search Report dated Dec. 26, 2019, 4 pages.

(Continued)

*Primary Examiner* — Khanh C Tran
(74) *Attorney, Agent, or Firm* — Lee, Hong, Degerman, Kang & Waimey PC

(57) ABSTRACT

A method and an apparatus for transmitting a PPDU in a WLAN system are proposed. Specifically, a transmitter generates a PPDU and transmits the PPDU to a receiver. The PPDU includes a legacy field and an EHT field. The legacy field includes an L-STF. The EHT field includes a data field. The legacy field is configured on the basis of a CSD value per a transmission chain. The CSD value is determined by a candidate CSD value that is the minimum of the sums of a first absolute value and a second absolute value on the basis of a power ratio. The power ratio is a ratio of received power of the L-STF to received power of the data field. The first absolute value is an absolute value of a value related to 5 percent of a CDF relative to the power ratio. The second (Continued)

absolute value is an absolute value of a value related to 95 percent of the CDF relative to the power ratio.

17 Claims, 21 Drawing Sheets

(51) Int. Cl.
*H04W 72/04* (2009.01)
*H04W 84/12* (2009.01)

(58) Field of Classification Search
CPC . H04L 27/26; H04L 27/2626; H04L 27/2627; H04L 27/2639
See application file for complete search history.

(56) References Cited

U.S. PATENT DOCUMENTS

2019/0115970 A1* 4/2019 Vermani ............. H04L 27/2613
2021/0126755 A1* 4/2021 Gan ...................... H04L 5/0053

OTHER PUBLICATIONS

Lim, et al., "CSD update for 28.3.6," IEEE 802.11-17/0056r0714r4, May 2017, 5 pages.

* cited by examiner

FIG. 1
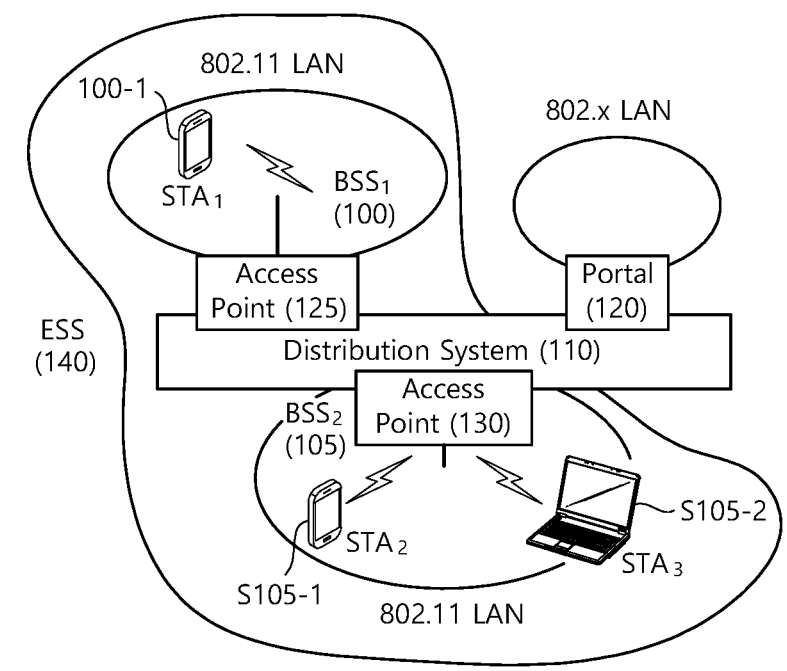
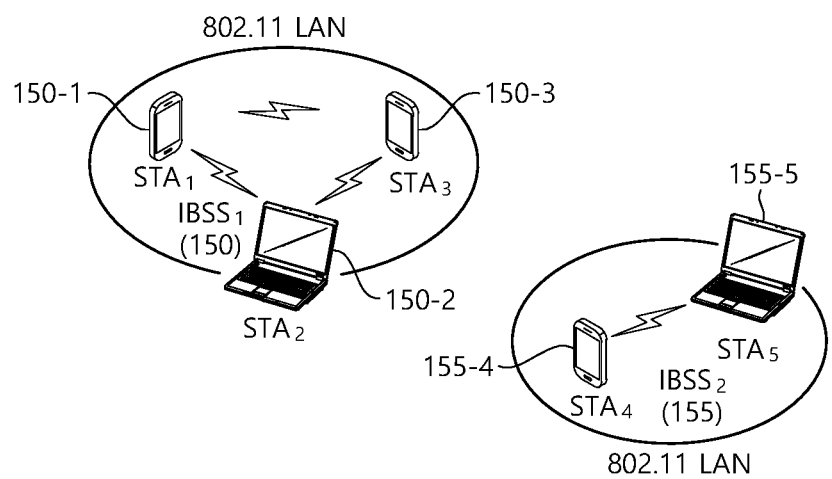

METHOD AND APPARATUS FOR TRANSMITTING PPDU IN WLAN SYSTEM

CROSS-REFERENCE TO RELATED APPLICATIONS

This application is the National Stage filing under 35 U.S.C. 371 of International Application No. PCT/KR2019/012033, filed on Sep. 18, 2019, which claims the benefit of earlier filing date and right of priority to KR Application No. 10-2018-0112516, filed on Sep. 19, 2018, the contents of which is hereby incorporated by reference herein in its entirety.

BACKGROUND OF THE DISCLOSURE

Field of the Disclosure

The present disclosure relates to a method and a device for transmitting a PPDU in a wireless LAN system by applying a CSD value defined with respect to up to 16 transmit chains to a legacy field.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY

The present disclosure provides a method and a device for transmitting a PPDU in a WLAN system.

One embodiment of the present disclosure proposes a method for transmitting a PPDU.

The present embodiment may be performed in a network environment supporting the next-generation WLAN system. The next-generation WLAN system is a WLAN system that is an improved 802.11ax system and may satisfy backward compatibility with the 802.11ax system. The next-generation WLAN system may correspond to the Extreme High Throughput (EHT) WLAN system or 802.11be WLAN system.

The present embodiment may be performed by a transmitting device, where the transmitting device may correspond to an AP. A receiving device may correspond to a non-AP STA.

To prevent unintended beamforming, the present embodiment proposes a method and a device for transmitting a PPDU by applying CSD for each transmission chain (or space-time stream). According to the method and the device, a difference between reception powers of the L-STF and data fields of the PPDU may be minimized, and efficient transmission supporting backward compatibility may be performed.

A transmitting device generates the Physical Protocol Data Unit (PPDU).

The transmitting device transmits the PPDU to a receiving device.

The PPDU includes a legacy field and an Extreme High Throughput (EHT) field. The legacy field includes a Legacy-Short Training Field (L-STF), and the EHT field includes a data field. More specifically, the legacy field includes fields (from the L-STF) up to the EHT-SIG-A, and the EHT field includes fields from EHT-STF to the data fields. The legacy field may be a field supported by a WLAN system compliant with the pre-802.11be, and the EHT field may be a field supported by the 802.11be WLAN system.

The legacy field is composed based on a Cyclic Shift Delay (CSD) value for each transmit chain. In the 802.11be WLAN system, the transmitting device and the receiving device may support up to 16 transmit chains. In other words, the present embodiment proposes a method for determining a CSD value that may be applied to each transmit chain of the legacy field to prevent unintended beamforming.

Since a legacy WLAN system supports only up to 8 transmit chains, when the total number of transmit chains ranges from 9 to 16, the CSD value is not defined. The present embodiment proposes a method for defining a CSD value for 9 to 16 transmit chains additionally supported in the 802.11be WLAN system based on the CSD value intended up to 8 transmit chains.

A criterion (or a metric) for determining the CSD value is as follows.

As one example, the CSD value may be determined so that a sum of the absolute value of a value related to 5 percent of a CDF and the absolute value of a value related to 95 percent of the CDF is minimized. More specifically, the CSD value is determined as a candidate CSD value that minimizes a sum of a first absolute value and a second absolute value based on a power ratio.

The power ratio is a ratio of reception power of the L-STF to the reception power of the data field. In other words, the CSD value may be determined in such a way to minimize a difference between reception powers of the L-STF and data fields.

The first absolute value is the absolute value of a value related to 5 percent of a Cumulative Distribution Function (CDF) of the power ratio. The second absolute value is the absolute value of a value related to 95 percent of the CDF of the power ratio.

According to an embodiment proposed in the present disclosure, a PPDU may be transmitted by applying a CSD value defined for up to 16 transmit chains to a legacy field; thus, unintended beamforming may be prevented in the EHT WLAN system, a difference between reception powers of the L-STF and data fields of the PPDU may be minimized, and efficient transmission may be performed while backward compatibility is maintained.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
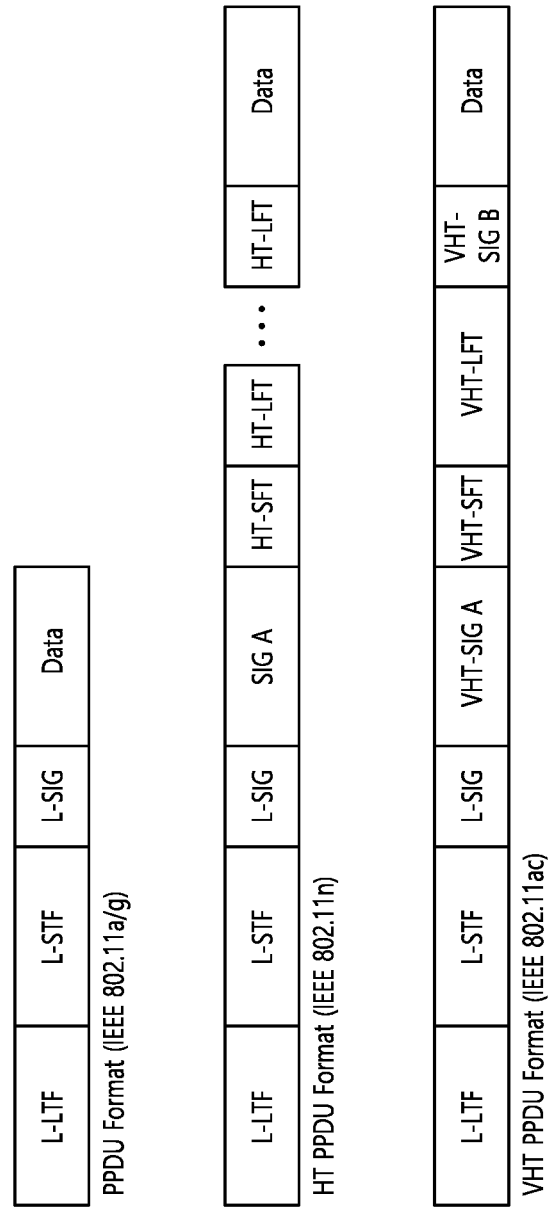
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs (100, 105) (hereinafter, referred to as BSS). The BSSs (100, 105), as a set of an AP and an STA such as an access point (AP) (125) and a station (STA1) (100-1) which are successfully synchronized to communicate with each other, are not concepts indicating a specific region. The BSS (105) may include one or more STAs (105-1, 105-2) which may be joined to one AP (130).

The BSS may include at least one STA, APs providing a distribution service, and a distribution system (DS) (110) connecting multiple APs.

The distribution system (110) may implement an extended service set (ESS) (140) extended by connecting the multiple BSSs (100, 105). The ESS (140) may be used as a term indicating one network configured by connecting one or more APs (125, 130) through the distribution system (110). The AP included in one ESS (140) may have the same service set identification (SSID).

A portal (120) may serve as a bridge which connects the wireless LAN network (IEEE 802.11) and another network (e.g., 802.X).

In the BSS illustrated in the upper part of FIG. 1, a network between the APs (125, 130) and a network between the APs (125, 130) and the STAs (100-1, 105-1, 105-2) may be implemented. However, the network is configured even between the STAs without the APs (125, 130) to perform communication. A network in which the communication is performed by configuring the network even between the STAs without the APs (125, 130) is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs (150-1, 150-2, 150-3, 155-4, 155-5) are managed by a distributed manner. In the IBS S, all STAs (150-1, 150-2, 150-3, 155-4, 155-5) may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in various meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, and so on. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
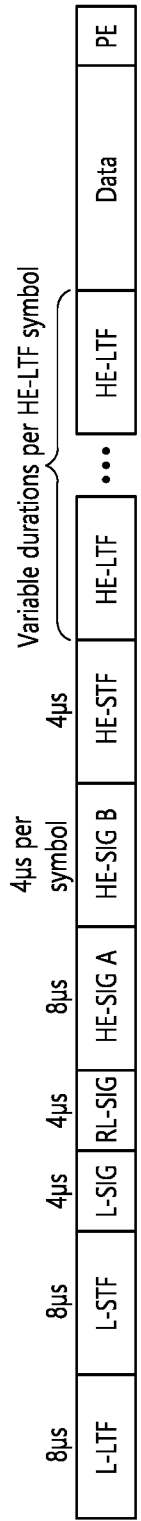
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
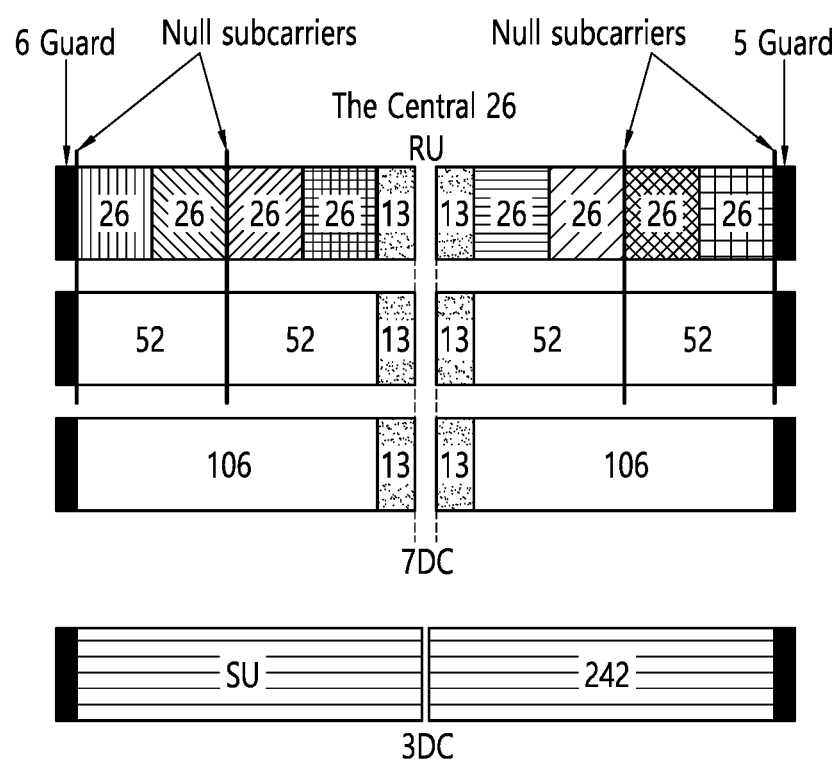
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and, in this case, as illustrated in a lowermost part of FIG. 4, one 242-unit may be used and, in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
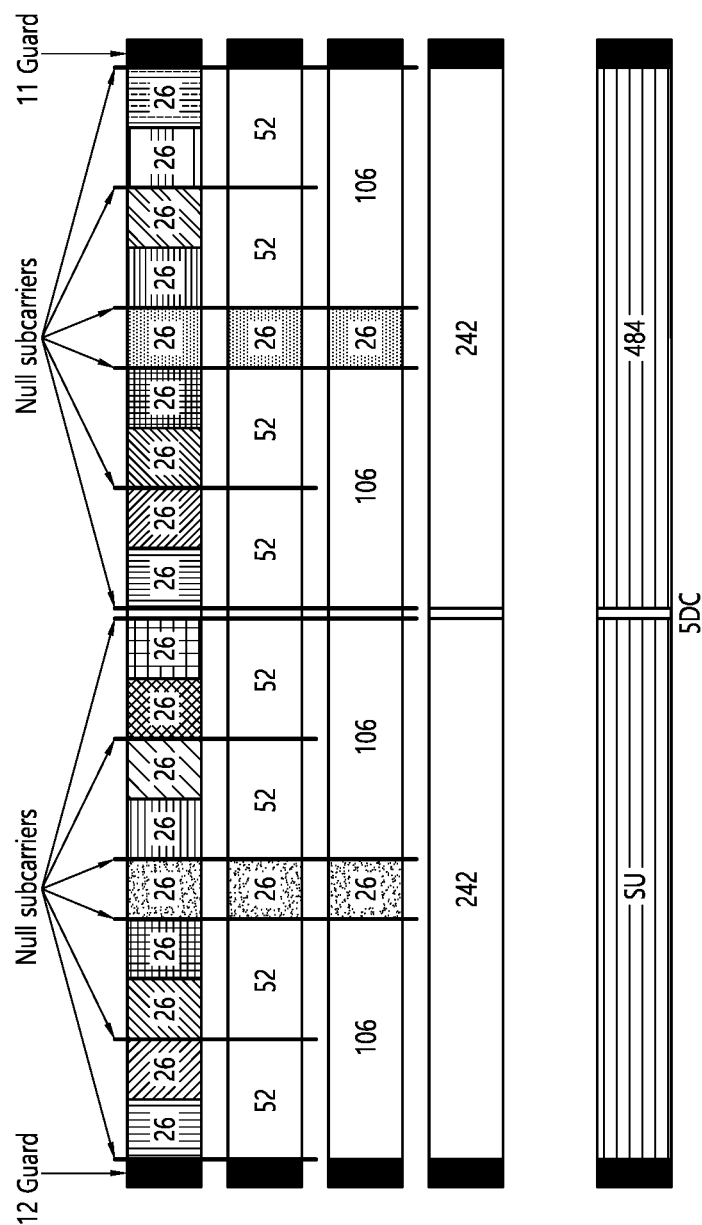
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like, may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
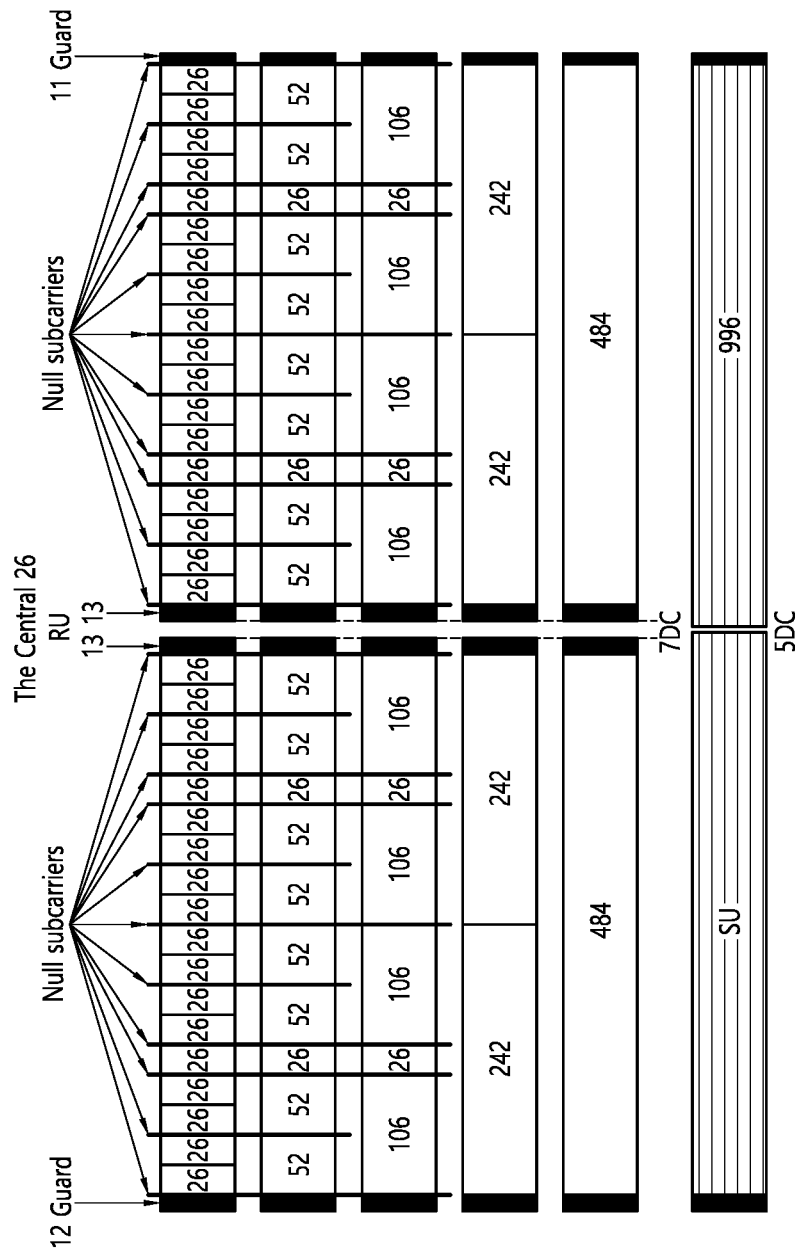
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like, may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and, in this case, 5 DC tones may be inserted.

Meanwhile, the detailed number of RUs may be modified similarly to one example of each of FIG. 4 or FIG. 5.

Figure 7:
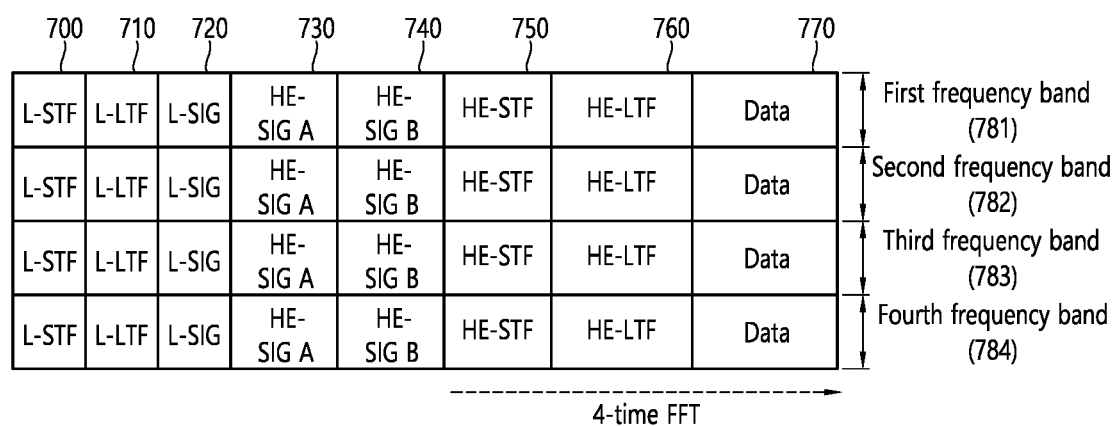
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF (700) may include a short training orthogonal frequency division multiplexing (OFDM) symbol. The L-STF (700) may be used for frame detection, automatic gain control (AGC), diversity detection, and coarse frequency/time synchronization.

An L-LTF (710) may include a long training orthogonal frequency division multiplexing (OFDM) symbol. The L-LTF (710) may be used for fine frequency/time synchronization and channel prediction.

An L-SIG (720) may be used for transmitting control information. The L-SIG (720) may include information regarding a data rate and a data length. Further, the L-SIG (720) may be repeatedly transmitted. That is, a new format, in which the L-SIG (720) is repeated (for example, may be referred to as R-LSIG) may be configured.

An HE-SIG-A (730) may include the control information common to the receiving station.

In detail, the HE-SIG-A (730) may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), and 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

In addition, the HE-SIG-A (730) may be composed of two parts: HE-SIG-A1 and HE-SIG-A2. HE-SIG-A1 and HE-SIG-A2 included in the HE-SIG-A may be defined by the following format structure (fields) according to the PPDU. First, the HE-SIG-A field of the HE SU PPDU may be defined as follows.

TABLE 1

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0.(#16803) |
| | B2 | UL/DL | 1 | Indicates whether the PPDU is sent UL or DL. Set to the value indicated by the TXVECTOR parameter UPLINK_FLAG. |
| | B3-B6 | MCS | 4 | For an HE SU PPDU: Set to n for MCSn, where n = 0, 1, 2, . . . , 11 Values 12-15 are reserved For HE ER SU PPDU with Bandwidth field set to 0 (242-tone RU): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 are reserved |
| | B7 | DCM | 1 | Indicates whether or not DCM is applied to the Data field for the MCS indicated. If the STBC field is 0, then set to 1 to indicate that DCM is applied to the Data field. Neither DCM nor STBC shall be applied if(#15489) both the DCM and STBC are set to 1. Set to 0 to indicate that DCM is not applied to the Data field. NOTE-DCM is applied only to HE-MCSs 0, 1, 3 and 4. DCM is applied only to 1 and 2 spatial streams. DCM is not applied in combination with STBC(#15490). |
| | B8-B13 | BSS Color | 6 | The BSS Color field is an identifier of the BSS. Set to the value of the TXVECTOR parameter BSS_-COLOR. |
| | B14 | Reserved | 1 | Reserved and set to 1 |
| | B15-B18 | Spatial Reuse | 4 | Indicates whether or not spatial reuse is allowed during the transmission of this PPDU(#16804). Set to a value from Table 28-21 (Spatial Reuse field encoding for an HE SU PPDU, HE ER SU PPDU, and HE MU PPDU), see 27.11.6 (SPATIAL_REUSE). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B20 | Bandwidth | 2 | For an HE SU PPDU: Set to 0 for 20 MHz Set to 1 for 40 MHz Set to 2 for 80 MHz Set to 3 for 160 MHz and 80 + 80 MHz For an HE ER SU PPDU: Set to 0 for 242-tone RU Set to 1 for upper frequency 106-tone RU within the primary 20 MHz Values 2 and 3 are reserved |
| | B21-B22 | GI + LTF Size | 2 | Indicates the GI duration and HE-LTF size. Set to 0 to indicate a 1x HE-LTF and 0.8 µs GI Set to 1 to indicate a 2x HE-LTF and 0.8 µs GI Set to 2 to indicate a 2x HE-LTF and 1.6 µs GI Set to 3 to indicate: a 4x HE-LTF and 0.8 µs GI if both the DCM and STBC fields are 1. Neither DCM nor STBC shall be applied if(#Ed) both the DCM and STBC fields are set to 1. a 4x HE-LTF and 3.2 µs GI, otherwise |

TABLE 1-continued

| Two Parts of HE-SIG-A | Bit | Field | Number of bits | Description |
|---|---|---|---|---|
| | B23-B25 | NSTS And Midamble Periodicity | 3 | If the Doppler field is 0, indicates the number of space-time streams.<br>Set to the number of space-time streams minus 1<br>For an HE ER SU PPDU, values 2 to 7 are reserved<br>If the Doppler field is 1, then B23-B24 indicates the number of space time streams, up to 4, and B25 indicates the midamble periodicity.<br>B23-B24 is set to the number of space time streams minus 1.<br>For an HE ER SU PPDU, values 2 and 3 are reserved<br>B25 is set to 0 if TXVECTOR parameter MIDAMBLE_PERIODICITY is 10 and set to 1 if TXVECTOR parameter MIDAMBLE_PERIODICITY is 20. |
| HE-SIG-A2 (HE SU PPDU) or HE-SIG-A3 (HE ER SU PPDU) | B0-B6 | TXOP | 7 | Set to 127 to indicate no duration information if(#15491) TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURAT1ON is less than 512, then B0 is set to 0 and B1-B6 is set to floor(TXOP_DURATION/8)(#16277).<br>Otherwise, B0 is set to 1 and B1-B6 is set to floor ((TXOP_DURATION - 512)/128)(#16277).<br>where(#16061)<br>B0 indicates the TXOP length granularity. Set to 0 for 8 μs; otherwise set to 1 for 128 μs.<br>B1-B6 indicates the scaled value of the TXOP_DURATION |
| | B7 | Coding | 1 | Indicates whether BCC or LDPC is used:<br>Set to 0 to indicate BCC<br>Set to 1 to indicate LDPC |
| | B8 | LDPC Extra Symbol Segment | 1 | Indicates the presence of the extra OFDM symbol segment for LDPC:<br>Set to 1 if an extra OFDM symbol segment for LDPC is present<br>Set to 0 if an extra OFDM symbol segment for LDPC is not present<br>Reserved and set to 1 if the Coding field is set to 0(#15492). |
| | B9 | STBC | 1 | If the DCM field is set to 0, then set to 1 if space time block coding is used. Neither DCM nor STBC shall be applied if(#15493) both the DCM field and STBC field are set to 1.<br>Set to 0 otherwise. |
| | B10 | Beam-formed(#16038) | 1 | Set to 1 if a beamforming steering matrix is applied to the waveform in an SU transmission.<br>Set to 0 otherwise. |
| | B11-B12 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B13 | PE Disambiguity | 1 | Indicates PE disambiguity(#16274) as defined in 28.3.12 (Packet extension). |
| | B14 | Reserved | 1 | Reserved and set to 1 |
| | B15 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (sec 28.3.11.16 Midamble), the midamble is not present, but the channel is fast varying. It recommends that midamble may be used for the PPDUs of the reverse link.<br>Set to 0 otherwise. |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE MU PPDU may be defined as follows.

TABLE 2

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL. Set to the value indicated by the TXVECTOR parameter UPLINK_FLAG.(#16805)<br>NOTE-The TDLS peer can identify the TDLS frame by To DS and From DS fields in the MAC header of the MPDU. |
| | B1-B3 | SIGB MCS | 3 | Indicates the MCS of the HE-SIG-B field:<br>Set to 0 for MCS 0<br>Set to 1 for MCS 1<br>Set to 2 for MCS 2<br>Set to 3 for MCS 3<br>Set to 4 for MCS 4<br>Set to 5 for MCS 5<br>The values 6 and 7 are reserved |
| | B4 | SIGB DCM | 1 | Set to 1 indicates that the HE-SIG-B is modulated with DCM for the MCS.<br>Set to 0 indicates that the HE-SIG-B is not modulated with DCM for the MCS.<br>NOTE-DCM is only applicable to MCS 0, MCS 1, MCS 3, and MCS 4. |
| | B5-B10 | BSS Color | 6 | The BSS Color field is an identifier of the BSS.<br>Set to the value of the TXVECTOR parameter BSS_-COLOR. |
| | B11-B14 | Spatial Reuse | 4 | Indicates whether or not spatial reuse is allowed during the transmission of this PPDU(#16806).<br>Set to the value of the SPATIAL_REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B17 | Bandwidth | 3 | Set to 0 for 20 MHz.<br>Set to 1 for 40 MHz.<br>Set to 2 for 80 MHz non-preamble puncturing mode.<br>Set to 3 for 160 MHz and 80 + 80 MHz non-preamble puncturing mode.<br>If the SIGB Compression field is 0:<br>Set to 4 for preamble puncturing in 80 MHz, where in the preamble only the secondary 20 MHz is punctured.<br>Set to 5 for preamble puncturing in 80 MHz, where in the preamble only one of the two 20 MHz sub-channels in secondary 40 MHz is punctured.<br>Set to 6 for preamble puncturing in 160 MHz or 80 + 80 MHz, where in the primary 80 MHz of the preamble only the secondary 20 MHz is punctured.<br>Set to 7 for preamble puncturing in 160 MHz or 80 + 80 MHz, where in the primary 80 MHz of the preamble the primary 40 MHz is present.<br>If the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field: (#15494)<br>Set to the number of OFDM symbols in the HE-SIG-B field minus 1 if the number of OFDM symbols in the HE-SIG-B field is less than 16;<br>Set to 15 to indicate that the number of OFDM symbols in the HE-SIG-B field is equal to 16 if Longer Than 16 HE SIG-B OFDM Symbols Support subfield of the HE Capabilities element transmitted by at least one recipient STA is 0;<br>Set to 15 to indicate that the number of OFDM symbols in the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without |

TABLE 2-continued

| Two Parts of HE-SIG-A | Bit | Field | Number of bits | Description |
|---|---|---|---|---|
| | | | | DCM. The exact number of OFDM symbols in the HE-SIG-B field is calculated based on the number of User fields in the HE-SIG-B content channel which is indicated by HE-SIG-B common field in this case. If the HE-SIG-B Compression field is set to 1, indicates the number of MU-MIMO users and is set to the number of NU-MIMO users minus 1(#15495). |
| | B22 | SIGB Compression | 1 | Set to 0 if the Common field in HE-SIG-B is present. Set to 1 if the Common field in HE-SIG-B is not present.(#16139) |
| | B23-B24 | GI + LTF Size | 2 | Indicates the GI duration and HE-LTF size: Set to 0 to indicate a 4x HE-LTF and 0.8 μs GI Set to 1 to indicate a 2x HE-LTF and 0.8 μs GI Set to 2 to indicate a 2x HE-LTF and 1.6 μs GI Set to 3 to indicate a 4x HE-LTF and 3.2 μs GI |
| | B25 | Doppler | 1 | Set to 1 if one of the following applies: The number of OFDM symbols in the Data field is larger than the signaled midamble periodicity plus 1 and the midamble is present The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link. Set to 0 otherwise. |
| HE-SIG-A2 | B0-B6 | TXOP | 7 | Set to 127 to indicate no duration information if(#15496) TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8)(#16277). Otherwise, B0 is set to 1 and B1-B6 is set to floor((TXOP_DURATION - 512)/128)(#16277). where(#16061) B0 indicates the TXOP length granularity. Set to 0 for 8 μs; otherwise set to 1 for 128 μs. B1-B6 indicates the scaled value of the TXOP_DURATION |
| | B7 | Reserved | 1 | Reserved and set to 1 |
| | B8-B10 | Number of HE-LTF Symbols And Midamble Periodicity | 3 | If the Doppler field is set to 0(#15497), indicates the number of HE-LTF symbols: Set to 0 for 1 HE-LTF symbol Set to 1 for 2 HE-LTF symbols Set to 2 for 4 HE-LTF symbols Set to 3 for 6 HE-LTF symbols Set to 4 for 8 HE-LTF symbols Other values are reserved. If the Doppler field is set to 1(#15498), B8-B9 indicates the number of HE-LTF symbols(#16056) and B10 indicates midamble periodicity: B8-B9 is encoded as follows: 0 indicates 1 HE-LTF symbol 1 indicates 2 HE-LTF symbols 2 indicates 4 HE-LTF symbols 3 is reserved B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC. Set to 1 if an extra OFDM symbol segment for LDPC is present. Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload. STBC does not apply to HE-SIG-B. STBC is not applied if one or more RUs are used for MU-MIMO allocation.(#15661) |

TABLE 2-continued

| Two Parts of HE-SIG-A | Bit | Field | Number of bits | Description |
|---|---|---|---|---|
| | B13-B14 | Pre-FEC Padding Factor | 2 | Indicates the pre-FEC padding factor. Set to 0 to indicate a pre-FEC padding factor of 4 Set to 1 to indicate a pre-FEC padding factor of 1 Set to 2 to indicate a pre-FEC padding factor of 2 Set to 3 to indicate a pre-FEC padding factor of 3 |
| | B15 | PE Disambiguity | 1 | Indicates PE disambiguity(#16274) as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

In addition, the HE-SIG-A field of the HE TB PPDU may be defined as follows.

TABLE 3

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 0 for an HE TB PPDU |
| | B1-B6 | BSS Color | 6 | The BSS Color field is an identifier of the BSS. Set to the value of the TXVECTOR parameter BSS_-COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz then this Spatial Reuse field applies to the first 20 MHz subband. If the Bandwidth field indicates 160/80 + 80 MHz then this Spatial Reuse field applies to the first 40 MHz subband of the 160 MHz operating band. Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP- based spatial reuse and non-SRG OBSS PD-based spatial reuse during this PPDU. For the interpretation of other values see 27.11.6 (SPATIAL_REUSE) and 27.9 (Spatial reuse operation). |
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz: This Spatial Reuse field applies to the second 20 MHz subband. If(#Ed) the STA operating channel width is 20 MHz, then this field is set to the same value as Spatial Reuse 1 field. If(#Ed) the STA operating channel width is 40 MHz in the 2.4 GHz band, this field is set to the same value as Spatial Reuse 1 field. If the Bandwidth field indicates 160/80 + 80 MHz the this Spatial Reuse field applies to the second 40 MHz subband of the 160 MHz operating band. Set to the value of the SPATIAL_REUSE(2) parameter of the TXVECTOR. which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial |

TABLE 3-continued

| Two Parts of HE-SIG-A | Bit | Field | Number of bits | Description |
|---|---|---|---|---|
| | | | | reuse during this PPDU. Set to SRP_AND_NON_SRG_OBSS_PD_PROIHBITED to prohibit both SRP- based spatial reuse and non-SRG OBSS PD-based spatial reuse during this PPDU. For the interpretation of other values see 27.11.6 (SPATIAL_REUSE) and 27.9 (Spatial reuse operation). |
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the third 20 MHz subband. If(#Ed) the STA operating channel width is 20 MHz or 40 MHz, this field is set to the same value as Spatial Reuse 1 field. If the Bandwidth field indicates 160/80 + 80 MHz: This Spatial Reuse field applies to the third 40 MHz subband of the 160 MHz operating band. If(#Ed) the STA operating channel width is 80 + 80 MHz, this field is set to the same value as Spatial Reuse 1 field. Set to the value of the SPATIAL_REUSE(3) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP- based spatial reuse and non-SRG OBSS PD-based spatial reuse during this PPDU. For the interpretation of other values see 27.11.6 (SPATIAL_REUSE) and 27.9 (Spatial reuse operation). |
| | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the fourth 20 MHz subband. If(#Ed) the STA operating channel width is 20 MHz, then this field is set to the same value as Spatial Reuse 1 field. If(#Ed) the STA operating channel width is 40 MHz, then this field is set to the same value as Spatial Reuse 2 field. If the Bandwidth field indicates 160/80 + 80 MHz: This Spatial Reuse field applies to the fourth 40 MHz subband of the 160 MHz operating band. If(#Ed) the STA operating channel width is 80 + 80 MHz, then this field is set to same value as Spatial Reuse 2 field. Set to the value of the SPATIAL_REUSE(4) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP- based spatial reuse and non-SRG OBSS PD-based spatial reuse during this PPDU. For the interpretation of other values see 27.11.6 (SPATIAL_REUSE) and 27.9 (Spatial reuse operation). |
| | B23 | Reserved | 1 | Reserved and set to 1. NOTE-Unlike other Reserved fields in HE-SIG-A of the HE TB PPDU, B23 does not have a corresponding bit in the Trigger frame. |

TABLE 3-continued

| Two Parts of HE-SIG-A | Bit | Field | Number of bits | Description |
|---|---|---|---|---|
| | B24-B25 | Bandwidth | 2 | (#16003)Set to 0 for 20 MHz<br>Set to 1 for 40 MHz<br>Set to 2 for 80 MHz<br>Set to 3 for 160 MHz and 80 + 80 MHz |
| HE-SIG-A2 | B0-B6 | TXOP | 7 | Set to 127 to indicate no duration information if(#15499) TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8)(#16277).<br>Otherwise, B0 is set to 1 and B1-B6 is set to floor ((TXOP_DURATION - 512)/128)(#16277).<br>where(#16061)<br>B0 indicates the TXOP length granularity. Set to 0 for 8 µs; otherwise set to 1 for 128 µs.<br>B1-B6 indicates the scaled value of the TXOP_DURATION |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

An HE-SIG-B (740) may be included only in the case of the PPDU for the multiple users (MUs) as described above. Principally, an HE-SIG-A (750) or an HE-SIG-B (760) may include resource allocation information (alternatively, virtual resource allocation information) for at least one receiving STA.

Figure 8:
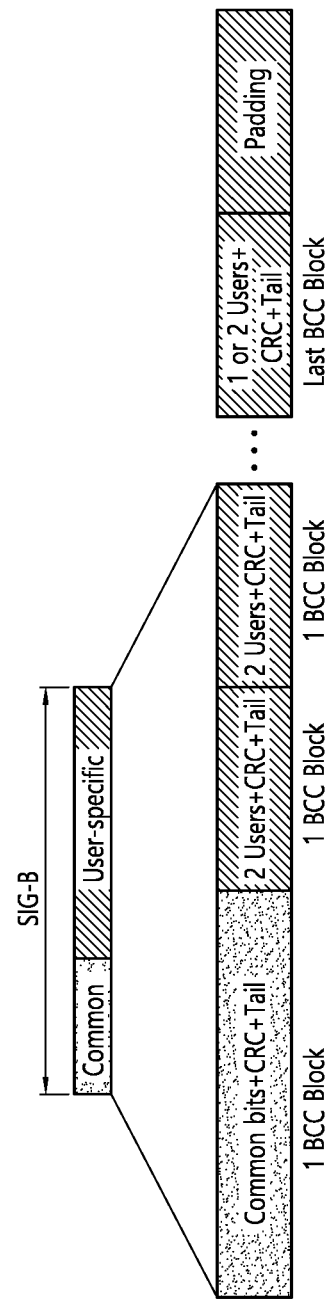
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B (740) may be transmitted in a duplicated form on a MU PPDU. In the case of the HE-SIG-B (740), the HE-SIG-B (740) transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B (740) in a specific frequency band (e.g., the second frequency band) is duplicated with the HE-SIG-B (740) of another frequency band (e.g., the fourth frequency band). Alternatively, the HE-SIG-B (740) may be transmitted in an encoded form on all transmission resources. A field after the HE-SIG B (740) may include individual information for respective receiving STAs receiving the PPDU.

The HE-STF (750) may be used for improving automatic gain control estimation in a multiple input multiple output (MIMO) environment or an OFDMA environment.

The HE-LTF (760) may be used for estimating a channel in the MIMO environment or the OFDMA environment.

The size of fast Fourier transform (FFT)/inverse fast Fourier transform (IFFT) applied to the HE-STF (750) and the field after the HE-STF (750), and the size of the FFT/IFFT applied to the field before the HE-STF (750) may be different from each other. For example, the size of the FFT/IFFT applied to the HE-STF (750) and the field after the HE-STF (750) may be four times larger than the size of the FFT/IFFT applied to the field before the HE-STF (750).

For example, when at least one field of the L-STF (700), the L-LTF (710), the L-SIG (720), the HE-SIG-A (730), and the HE-SIG-B (740) on the PPDU of FIG. 7 is referred to as a first field, at least one of the data field (770), the HE-STF (750), and the HE-LTF (760) may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 us and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A (730) and may be instructed to receive the downlink PPDU based on the HE-SIG-A (730). In this case, the STA may perform decoding based on the FFT size changed from the HE-STF (750) and the field after the HE-STF (750). On the contrary, when the STA may not be instructed to receive the downlink PPDU based on the HE-SIG-A (730), the STA may stop the decoding and configure a network allocation vector (NAV). A cyclic prefix (CP) of the HE-STF (750) may have a larger size than the CP of another field and the during the CP period, the STA may perform the decoding for the downlink PPDU by changing the FFT size.

Hereinafter, in the embodiment of the present disclosure, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the total bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, subchannels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, subchannel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, subchannels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, subchannel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
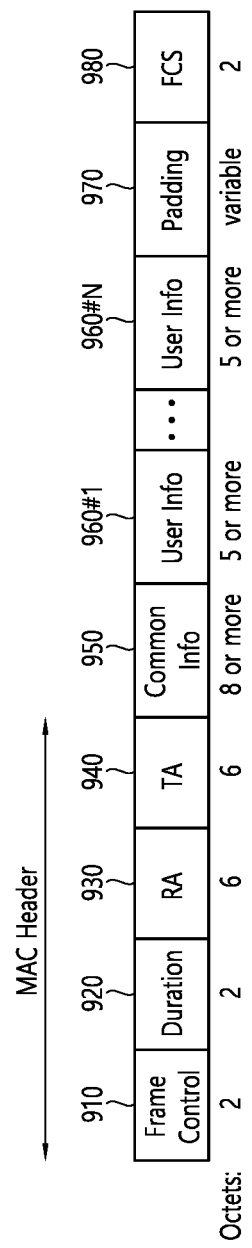
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field (910) shown in FIG. 9 may include information related to a version of the MAC protocol and other additional control information, and a Duration field (920) may include time information for configuring a NAV or information related to an identifier (e.g., AID) of the user equipment.

Also, the RA field (930) includes address information of a receiving STA of the corresponding trigger frame and may be omitted if necessary. The TA field (940) includes address information of an STA triggering the corresponding trigger frame (for example, an AP), and the common information field (950) includes common control information applied to a receiving STA that receives the corresponding trigger frame. For example, a field indicating the length of the L-SIG field of the UL PPDU transmitted in response to the corresponding trigger frame or information controlling the content of the SIG-A field (namely, the HE-SIG-A field) of the UL PPDU transmitted in response to the corresponding trigger frame may be included. Also, as common control information, information on the length of the CP of the UP PPDU transmitted in response to the corresponding trigger frame or information on the length of the LTF field may be included.

Also, it is preferable to include a per user information field (960 #1 to 960 #N) corresponding to the number of receiving STAs that receive the trigger frame of FIG. 9. The per user information field may be referred to as an "RU allocation field".

Also, the trigger frame of FIG. 9 may include a padding field (970) and a frame check sequence field (980).

It is preferable that each of the per user information fields (960 #1 to 960 #N) shown in FIG. 9 includes a plurality of subfields.

Figure 10:
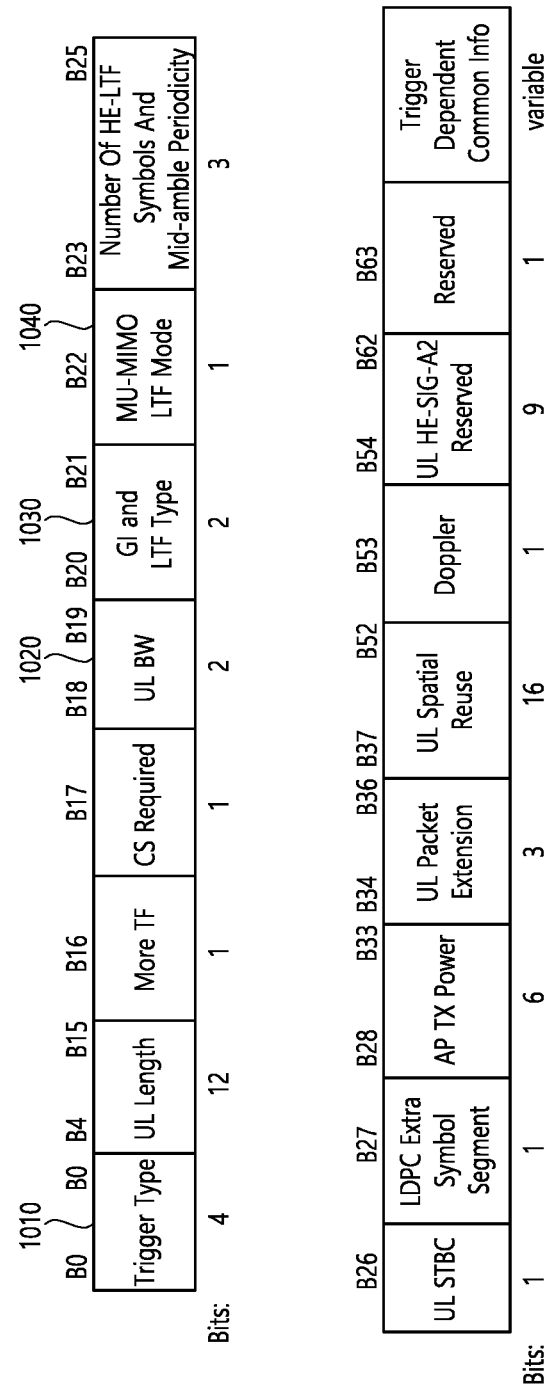
FIG. 10 illustrates an example of a common information field.

FIG. 10 illustrates an example of a common information field. Among the subfields of FIG. 10, some may be omitted, and other additional subfields may also be added. Additionally, the length of each of the subfields shown in the drawing may be varied.

The trigger type field (1010) of FIG. 10 may indicate a trigger frame variant and encoding of the trigger frame variant. The trigger type field (1010) may be defined as follows.

TABLE 4

| Trigger Type subfield value | Trigger frame variant |
| --- | --- |
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

The UL BW field (1020) of FIG. 10 indicates bandwidth in the HE-SIG-A field of an HE Trigger Based (TB) PPDU. The UL BW field (1020) may be defined as follows.

TABLE 5

| ULBW subfield value | Description |
| --- | --- |
| 0 | 20 MHz |
| 1 | 40 MHz |
| 2 | 80 MHz |
| 3 | 80 + 80 MHz or 160 MHz |

The Guard Interval (GI) and LTF type fields (1030) of FIG. 10 indicate the GI and HE-LTF type of the HE TB PPDU response. The GI and LTF type field (1030) may be defined as follows.

TABLE 6

| GI And LTF field value | Description |
| --- | --- |
| 0 | 1x HE-LTF + 1.6 μs GI |
| 1 | 2x HE-LTF + 1.6 μs GI |
| 2 | 4x HE-LTF + 3.2 μs GI(#15968) |
| 3 | Reserved |

Also, when the GI and LTF type fields (1030) have a value of 2 or 3, the MU-MIMO LTF mode field (1040) of FIG. 10 indicates the LTF mode of a UL MU-MIMO HE TB PPDU response. At this time, the MU-MIMO LTF mode field (1040) may be defined as follows.

If the trigger frame allocates an RU that occupies the whole HE TB PPDU bandwidth and the RU is allocated to one or more STAs, the MU-MIMO LTF mode field (1040) indicates one of an HE single stream pilot HE-LTF mode or an HE masked HE-LTF sequence mode.

If the trigger frame does not allocate an RU that occupies the whole HE TB PPDU bandwidth and the RU is not allocated to one or more STAs, the MU-MIMO LTF mode field (1040) indicates the HE single stream pilot HE-LTF mode. The MU-MIMO LTF mode field (1040) may be defined as follows.

TABLE 7

| MU-MIMO LTF subfield value | Description |
| --- | --- |
| 0 | HE single stream pilot HE-LTF mode |
| 1 | HE masked HE-LTF sequence mode |

Figure 11:
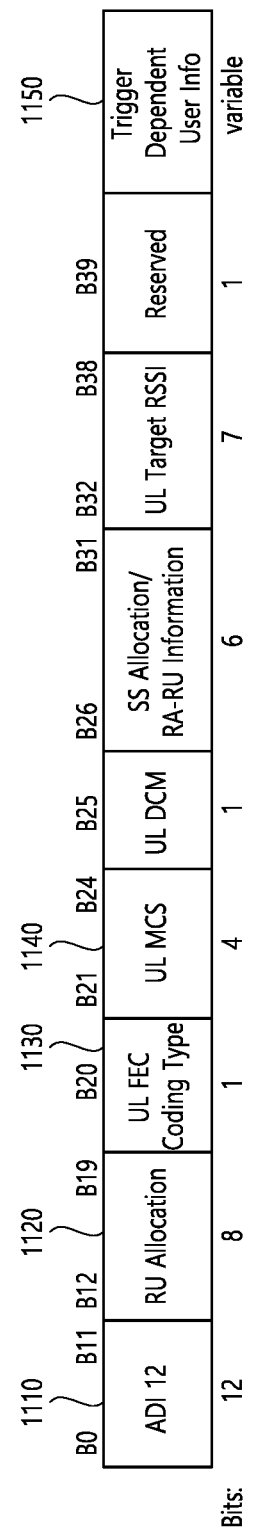
FIG. 11 illustrates an example of a sub-field being included in a per user information field.

FIG. 11 illustrates an example of a subfield being included in a per user information field. Among the subfields of FIG. 11, some may be omitted, and other additional subfields may also be added. Additionally, the length of each of the subfields shown in the drawing may be varied.

The User Identifier field of FIG. 11 (or AID12 field, 1110) indicates the identifier of an STA (namely, a receiving STA) corresponding to per user information, where an example of the identifier may be the whole or part of the AID.

Also, an RU Allocation field (1120) may be included. In other words, when a receiving STA identified by the User Identifier field (1110) transmits a UL PPDU in response to the trigger frame of FIG. 9, the corresponding UL PPDU is transmitted through an RU indicated by the RU Allocation field (1120). In this case, it is preferable that the RU indicated by the RU Allocation field (1120) indicates the RUs shown in FIGS. 4, 5, and 6. A specific structure of the RU Allocation field (1120) will be described later.

The subfield of FIG. 11 may include a (UL FEC) coding type field (1130). The coding type field (1130) may indicate the coding type of an uplink PPDU transmitted in response to the trigger frame of FIG. 9. For example, when BCC coding is applied to the uplink PPDU, the coding type field (1130) may be set to '1', and when LDPC coding is applied, the coding type field (1130) may be set to '0'.

Additionally, the subfield of FIG. 11 may include a UL MCS field (1140). The MCS field (1140) may indicate an MCS scheme being applied to the uplink PPDU that is transmitted in response to the trigger frame of FIG. 9.

Also, the subfield of FIG. 11 may include a Trigger Dependent User Info field (1150). When the Trigger Type field (1010) of FIG. 10 indicates a basic trigger variant, the Trigger Dependent User Info field (1150) may include an MPDU MU Spacing Factor subfield (2 bits), a TID Aggregate Limit subfield (3 bits), a Reserved field (1 bit), and a Preferred AC subfield (2 bits).

Hereinafter, the present disclosure proposes an example of improving a control field included in a PPDU. The control field improved according to the present disclosure includes a first control field including control information required to interpret the PPDU and a second control field including control information for decode the data field of the PPDU. The first and second control fields may be used for various fields. For example, the first control field may be the HE-SIG-A (730) of FIG. 7, and the second control field may be the HE-SIG-B (740) shown in FIGS. 7 and 8.

Hereinafter, a specific example of improving the first or the second control field will be described.

In the following example, a control identifier inserted to the first control field or a second control field is proposed. The size of the control identifier may vary, which, for example, may be implemented with 1-bit information.

The control identifier (for example, a 1-bit identifier) may indicate whether a 242-type RU is allocated when, for example, 20 MHz transmission is performed. As shown in FIGS. 4 to 6, RUs of various sizes may be used. These RUs may be divided broadly into two types. For example, all of the RUs shown in FIGS. 4 to 6 may be classified into 26-type RUs and 242-type RUs. For example, a 26-type RU may include a 26-RU, a 52-RU, and a 106-RU while a 242-type RU may include a 242-RU, a 484-RU, and a larger RU.

The control identifier (for example, a 1-bit identifier) may indicate that a 242-type RU has been used. In other words, the control identifier may indicate that a 242-RU, a 484-RU, or a 996-RU is included. If the transmission frequency band in which a PPDU is transmitted has a bandwidth of 20 MHz, a 242-RU is a single RU corresponding to the full bandwidth of the transmission frequency band (namely, 20 MHz). Accordingly, the control identifier (for example, 1-bit identifier) may indicate whether a single RU corresponding to the full bandwidth of the transmission frequency band is allocated.

For example, if the transmission frequency band has a bandwidth of 40 MHz, the control identifier (for example, a 1-bit identifier) may indicate whether a single RU corresponding to the full bandwidth (namely, bandwidth of 40 MHz) of the transmission frequency band has been allocated. In other words, the control identifier may indicate whether a 484-RU has been allocated for transmission in the frequency band with a bandwidth of 40 MHz.

For example, if the transmission frequency band has a bandwidth of 80 MHz, the control identifier (for example, a 1-bit identifier) may indicate whether a single RU corresponding to the full bandwidth (namely, bandwidth of 80 MHz) of the transmission frequency band has been allocated. In other words, the control identifier may indicate whether a 996-RU has been allocated for transmission in the frequency band with a bandwidth of 80 MHz.

Various technical effects may be achieved through the control identifier (for example, 1-bit identifier).

First of all, when a single RU corresponding to the full bandwidth of the transmission frequency band is allocated through the control identifier (for example, a 1-bit identifier), allocation information of the RU may be omitted. In other words, since only one RU rather than a plurality of RUs is allocated over the whole transmission frequency band, allocation information of the RU may be omitted deliberately.

Also, the control identifier may be used as signaling for full bandwidth MU-MIMO. For example, when a single RU is allocated over the full bandwidth of the transmission frequency band, multiple users may be allocated to the corresponding single RU. In other words, even though signals for each user are not distinctive in the temporal and spatial domains, other techniques (for example, spatial multiplexing) may be used to multiplex the signals for multiple users in the same, single RU. Accordingly, the control identifier (for example, a 1-bit identifier) may also be used to indicate whether to use the full bandwidth MU-MIMO described above.

The common field included in the second control field (HE-SIG-B, 740) may include an RU allocation subfield. According to the PPDU bandwidth, the common field may include a plurality of RU allocation subfields (including N RU allocation subfields). The format of the common field may be defined as follows.

TABLE 8

| Subfield | Number of bits | Description |
| --- | --- | --- |
| RU Allocation | N × 8 | Indicates the RU assignment to be used in the data portion in the frequency domain. It also indicates the number of users in each RU. For RUs of size greater than or equal to 106-tones that support MU-MIMO, it indicates the number of users multiplexed using MU-MIMO.<br>Consists of N RU Allocation subfields:<br>N = 1 for a 20 MHz and a 40 MHz HE MU PPDU<br>N = 2 for an 80 MHz HE MU PPDU<br>N = 4 for a 160 MHz or 80 + 80 MHz HE MU PPDU |
| Center 26-tone RU | 1 | This field is present only if(#15510) the value of the Bandwidth field of HE-SIG-A field in an HE MU PPDU is set to greater than 1.<br>If the Bandwidth field of the HE-SIG-A field in an HE MU PPDU is set to 2, 4 or 5 for 80 MHz:<br>Set to 1 to indicate that a user is allocated to the center 26-tone RU (see FIG. 28-7 (RU locations in an 80 MHz HE PPDU(#16528))); otherwise, set to 0. The same value is applied to both HE-SIG-B content channels.<br>If the Bandwidth field of the HE-SIG-A field in an HE MU PPDU is set to 3, 6 or 7 for 160 MHz or 80 + 80 MHz:<br>For HE-SIG-B content channel 1, set to 1 to indicate that a user is allocated to the center 26-tone RU of the lower frequency 80 MHz; otherwise, set to 0.<br>For HE-SIG-B content channel 2, set to 1 to indicate that a user is allocated to the center 26-tone RU of the higher frequency 80 MHz; otherwise, set to 0. |
| CRC | 4 | See 28.3.10.7.3 (CRC computation) |
| Tail | 6 | Used to terminate the trellis of the convolutional decoder. Set to 0 |

The RU allocation subfield included in the common field of the HE-SIG-B may be configured with 8 bits and may indicate as follows with respect to 20 MHz PPDU bandwidth. RUs to be used as a data portion in the frequency domain are allocated using an index for RU size and disposition in the frequency domain. The mapping between an 8-bit RU allocation subfield for RU allocation and the number of users per RU may be defined as follows.

TABLE 9

| 8 bits indices (B7 B6 B5 B4 B3 B2 B1 B0) | #1 | #2 | #3 | #4 | #5 | #6 | #7 | #8 | #9 | Number of entries |
| --- | --- | --- | --- | --- | --- | --- | --- | --- | --- | --- |
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |

TABLE 9-continued

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00001110 | 52 |  | 52 | 26 | 52 |  | 26 | 26 |  | 1 |
| 00001111 | 52 |  | 52 | 26 | 52 |  |  | 52 |  | 1 |
| 00010$y_2y_1y_0$ | 52 |  | 52 | — |  | 106 |  |  |  | 8 |
| 00011$y_2y_1y_0$ |  | 106 |  | — | 52 |  |  | 52 |  | 8 |
| 00100$y_2y_1y_0$ | 26 | 26 | 26 | 26 | 26 |  | 106 |  |  | 8 |
| 00101$y_2y_1y_0$ | 26 | 26 | 52 |  | 26 |  | 106 |  |  | 8 |
| 00110$y_2y_1y_0$ | 52 |  | 26 | 26 | 26 |  | 106 |  |  | 8 |
| 00111$y_2y_1y_0$ | 52 |  | 52 |  | 26 |  | 106 |  |  | 8 |
| 01000$y_2y_1y_0$ |  | 106 |  |  | 26 | 26 | 26 | 26 | 26 | 8 |
| 01001$y_2y_1y_0$ |  | 106 |  |  | 26 | 26 | 26 |  | 52 | 8 |
| 01010$y_2y_1y_0$ |  | 106 |  |  | 26 | 52 |  | 26 | 26 | 8 |
| 01011$y_2y_1y_0$ |  | 106 |  |  | 26 | 52 |  | 52 |  | 8 |
| 0110$y_1y_0z_1z_0$ |  | 106 |  |  | — |  | 106 |  |  | 16 |
| 01110000 | 52 |  | 52 |  | — | 52 |  | 52 |  | 1 |
| 01110001 | 242-tone RU empty ||||||||| 1 |
| 01110010 | 484-tone RU with zero User fields indicated in this RU Allocation subfield of the HE-SIG-B content channel ||||||||| 1 |
| 01110011 | 996-tone RU with zero User fields indicated in this RU Allocation subfield of the HE-SIG-B content channel ||||||||| 1 |
| 011101$x_1x_0$ | Reserved ||||||||| 4 |
| 01111$y_2y_1y_0$ | Reserved ||||||||| 8 |
| 10$y_2y_1y_0z_2z_1z_0$ |  | 106 |  |  | 26 |  | 106 |  |  | 64 |
| 11000$y_2y_1y_0$ |  |  |  | 242 |  |  |  |  |  | 8 |
| 11001$y_2y_1y_0$ |  |  |  | 484 |  |  |  |  |  | 8 |
| 11010$y_2y_1y_0$ |  |  |  | 996 |  |  |  |  |  | 8 |
| 11011$y_2y_1y_0$ | Reserved ||||||||| 8 |
| 111$x_4x_3x_2x_1x_0$ | Reserved ||||||||| 32 |

If(#Ed) signaling RUs of size greater than 242 subcarriers, $y_2y_1y_0$ = 000-111 indicates number of User fields in the HE-SIG-B content channel that contains the corresponding 8-bit RU Allocation subfield. Otherwise, $y_2y_1y_0$ = 000-111 indicates number of STAs multiplexed in the 106-tone RU, 242-tone RU or the lower frequency 106-tone RU if there are two 106-tone RUs and one 26-tone RU is assigned between two 106-tone RUs. The binary vector $y_2y_1y_0$ indicates $2^2 \times y_2 + 2^1 \times y_1 + y_0 + 1$ STAs multiplexed the RU.
$z_2z_1z_0$ = 000-111 indicates number of STAs multiplexed in the higher frequency 106-tone RU if there are two 106-tone RUs and one 26-tone RU is assigned between two 106-tone RUs. The binary vector $z_2z_1z_0$ indicates $2^2 \times z_2 + 2^1 \times z_1 + z_0 + 1$ STAs multiplexed in the RU.
Similarly, $y_1y_0$ = 00-11 indicates number of STAs multiplexed in the lower frequency 106-tone RU. The binary vector $y_1y_0$ indicates $2^1 \times y_1 + y_0 + 1$ STAs multiplexed in the RU.
Similarly, $z_1z_0$ = 00-11 indicates the number of STAs multiplexed in the higher frequency 106-tone RU. The binary vector $z_1z_0$ indicates $2^1 \times z_1 + z_0 + 1$ STAs multiplexed in the RU.
1 to #9 (from left to the right) is ordered in increasing order of the absolute frequency.
$x_1x_0$ = 00-11, $x_4x_3x_2x_1x_0$ = 00000-11111.
'—' means no STA in that RU.

The user-specific field included in the second control field (HE-SIG-B, 740) may include a user field, a CRC field, and a Tail field. The format of the user-specific field may be defined as follows.

TABLE 10

| Subfield | Number of bits | Description |
|---|---|---|
| User field | N × 21 | The User field format for a non-MU-MIMO allocation is defined in Table 28-26 (User field format for a non-MU-MIMO allocation). The User field format for a MU-MIMO allocation is defined in Table 28-27 (User field for an MU-MIMO allocation). N = 1 if it is the last User Block field, and if there is only one user in the last User Block field. N = 2 otherwise. |
| CRC | 4 | The CRC is calculated over bits 0 to 20 for a User Block field that contains one User field, and bits 0 to 41 for a User Block field that contains two User fields. See 28.3.10.7.3 (CRC computation). |
| Tail | 6 | Used to terminate the trellis of the convolutional decoder. Set to 0. |

Also, the user-specific field of the HE-SIG-B is composed of a plurality of user fields. The plurality of user fields are located after the common field of the HE-SIG-B. The location of the RU allocation subfield of the common field and that of the user field of the user-specific field are used together to identify an RU used for transmitting data of an STA. A plurality of RUs designated as a single STA are now allowed in the user-specific field. Therefore, signaling that allows an STA to decode its own data is transmitted only in one user field.

As an example, it may be assumed that the RU allocation subfield is configured with 8 bits of 01000010 to indicate that five 26-tone RUs are arranged next to one 106-tone RU and three user fields are included in the 106-tone RU. At this time, the 106-tone RU may support multiplexing of the three users. This example may indicate that eight user fields included in the user-specific field are mapped to six RUs, the first three user fields are allocated according to the MU-MIMO scheme in the first 106-tone RU, and the remaining five user fields are allocated to each of the five 26-tone RUs.

Figure 12:
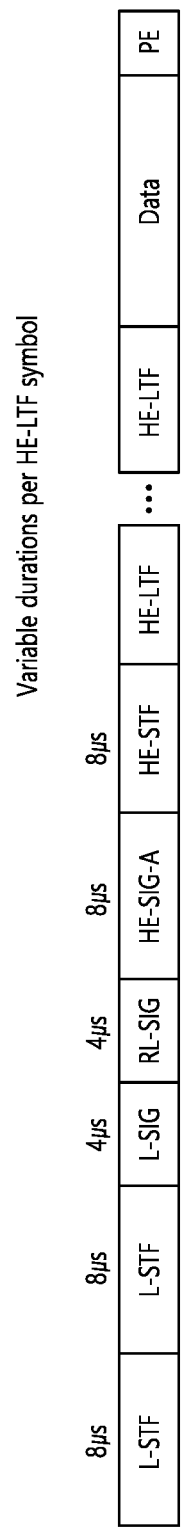
FIG. 12 illustrates one example of an HE TB PPDU.

FIG. 12 illustrates an example of an HE TB PPDU. The PPDU of FIG. 12 illustrates an uplink PPDU transmitted in response to the trigger frame of FIG. 9. At least one STA receiving a trigger frame from an AP may check the common information field and the individual user information field of the trigger frame and may transmit a HE TB PPDU simultaneously with another STA which has received the trigger frame.

As shown in the figure, the PPDU of FIG. 12 includes various fields, each of which corresponds to the field shown in FIGS. 2, 3, and 7. Meanwhile, as shown in the figure, the HE TB PPDU (or uplink PPDU) of FIG. 12 may not include the HE-SIG-B field but only the HE-SIG-A field.

In what follows, a block diagram of a transmitting device will be described.

Figure 13:
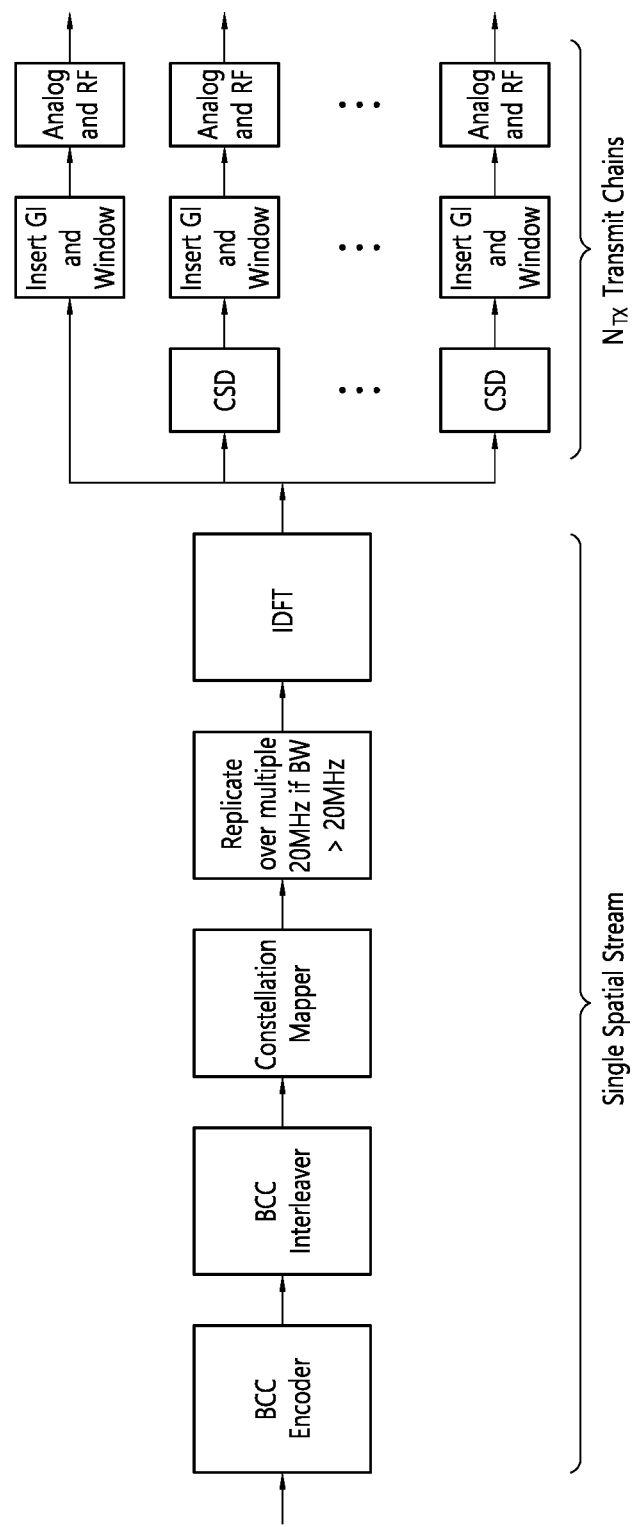
FIG. 13 is a block diagram of a transmitting device for an L-SIG and VHT-SIG-A fields.

Each field of a VHT PPDU may be generated through the following blocks.
a) PHY padding
b) Scrambler
c) BCC encoder parser
d) FEC (BCC or LDPC) encoders
e) Stream parser
f) Segment parser (for 160 MHz and 80+80 MHz transmissions)
g) BCC interleaver
h) Constellation mapper
i) Pilot insertion
j) Replicate over multiple 20 MHz (if BW>20 MHz)
k) Multiply by 1st column of $P_{VHT\text{-}LTF}$
l) LDPC tone mapper
m) Segment deparser
n) Space time block code (STBC) encoder
o) Cyclic shift diversity (CSD) per STS insertion
p) Spatial mapper
q) Inverse discrete Fourier transform (IDFT)
r) Cyclic shift diversity (CSD) per chain insertion
s) Guard interval (GI) insertion
t) Windowing FIG. 13 is a block diagram of a transmitting device for an L-SIG and VHT-SIG-A fields.

FIG. 13 illustrates a process for transmitting an L-SIG and VHT-SIG-A fields of a VHT PPDU using one frequency segment. The transmission block diagram of FIG. 13 is also used for generating an L-STF and L-LTF fields. However, the BCC encoder and the interleaver are not used for generating the L-STF and L-LTF fields.

Referring to FIG. 13, the L-SIG and VHT-SIG-A fields may be generated by using blocks of d) FEC (BCC or LDPC) encoder, g) BCC interleaver, h) Constellation mapper, j) Replicate over multiple 20 MHz (if BW>20 MHz), and q) Inverse Discrete Fourier Transform (IDFT) for a single spatial stream; and blocks of r) Cyclic Shift Diversity (CSD) per chain insertion, s) Guard Interval (GI), and t) Windowing for $N_{TX}$ transmit chains among the blocks generating the VHT PPDU.

Figure 14:
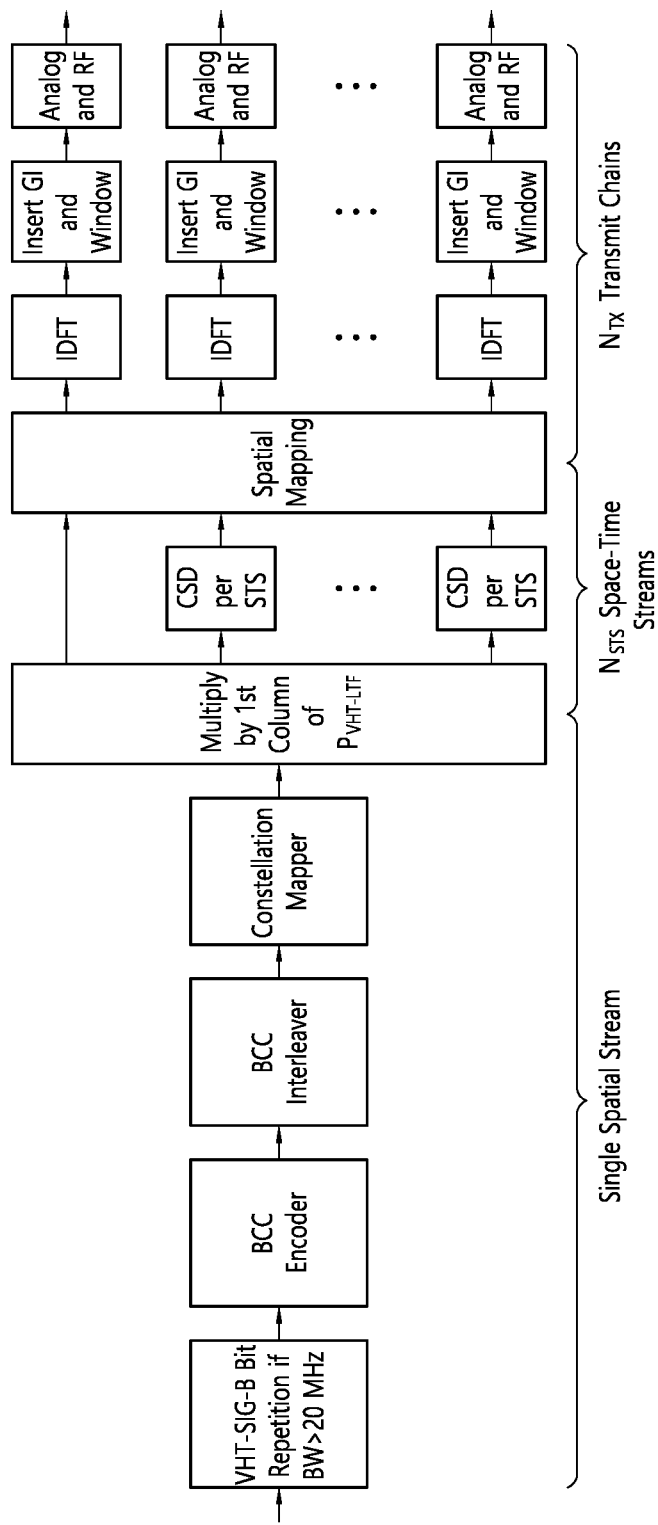
FIG. 14 is a block diagram of a transmitting device for VHT-SIG-B fields of 20 MHz, 40 MHz, and 80 MHz VHT SU PPDUs.

FIG. 14 is a block diagram of a transmitting device for VHT-SIG-B fields of 20 MHz, 40 MHz, and 80 MHz VHT SU PPDUs.

Referring to FIG. 14, the VHT-SIG-B fields of 20 MHz, 40 MHz, and 80 MHz VHT SU PPDUs may be generated by using blocks of the VHT-SIG-B-bit repetition block, d) FEC (BCC or LDPC) encoder, g) BCC interleaver, and h) Constellation mapper for a single spatial stream; and blocks of k) Multiply by 1st column of $P_{VHT\text{-}LTF}$, o) Cyclic Shift Diversity (CSD) per STS insertion, and p) Spatial mapper for an NSTS space-time stream; and blocks of q) Inverse Discrete Fourier Transform (IDFT), s) Guard Interval (GI) insertion, and t) Windowing for an $N_{TX}$ transmit chain among the blocks generating the VHT PPDU.

Also, a procedure for encoding a PPDU may be described as follows.

The L-STF field in the PPDU may be constructed from the following procedure.
a) Determine the channel bandwidth from the TXVECTOR parameter CH_BANDWIDTH.
b) Sequence generation: Generate the L-STF sequence over the channel bandwidth as described in 27.3.10.3 (L-STF). Apply a 3 dB power boost if transmitting an HE ER SU PPDU as described in 27.3.10.3 (L-STF).
c) Phase rotation: Apply appropriate phase rotation for each 20 MHz subchannel as described in 27.3.9 (Mathematical description of signals) and 21.3.7.5 (Definition of tone rotation).
d) CSD per STS: If the TXVECTOR parameter BEAM_CHANGE is 0, apply CSD per STS for each space-time stream and frequency segment as described in 27.3.10.2.2 (Cyclic shift for HE modulated fields).
e) Spatial mapping: If the TXVECTOR parameter BEAM_CHANGE is 0, apply the A matrix and the Q matrix as described in 27.3.10.3 (L-STF).
f) IDFT: Compute the inverse discrete Fourier transform.
g) CSD per chain: If the TXVECTOR parameter BEAM_CHANGE is 1 or not present, apply CSD per chain for each transmit chain and frequency segment as described in 27.3.10.2.1 (Cyclic shift for pre-HE modulated fields).
h) Insert GI and apply windowing: Prepend a GT ($T_{GLPre\text{-}HE}$) and apply windowing as described in 27.3.9 (Mathematical description of signals).
i) Analog and RF: Upconvert the resulting complex baseband waveform associated with each transmit chain to an RF signal according to the center frequency of the desired channel and transmit. Refer to 27.3.9 (Mathematical description of signals) and 27.3.10 (HE preamble) for details.

The L-LTF field in the PPDU may be constructed from the following procedure.
a) Determine the channel bandwidth from the TXVECTOR parameter CH_BANDWIDTH.
b) Sequence generation: Generate the L-LTF sequence over the channel bandwidth as described in 27.3.10.4 (L-LTF). Apply a 3 dB power boost if transmitting an HE ER SU PPDU as described in 27.3.10.4 (L-LTF).
c) Phase rotation: Apply appropriate phase rotation for each 20 MHz subchannel as described in 27.3.9 (Mathematical description of signals) and 21.3.7.5 (Definition of tone rotation).
d) CSD per STS: If the TXVECTOR parameter BEAM_CHANGE is 0, apply CSD per STS for each space-time stream and frequency segment as described in 27.3.10.2.2 (Cyclic shift for HE modulated fields) before spatial mapping.
e) Spatial mapping: If the TXVECTOR parameter BEAM_CHANGE is 0, apply the A matrix and the Q matrix as described in 27.3.10.4 (L-LTF).
f) IDFT: Compute the inverse discrete Fourier transform.
g) CSD per chain: If the TXVECTOR parameter BEAM_CHANGE is 1 or not present, apply CSD per chain for each transmit chain and frequency segment as described in 27.3.10.2.1 (Cyclic shift for pre-HE modulated fields).
  h) Insert GI and apply windowing: Prepend a GI ($T_{GLL\text{-}LTF}$) and apply windowing as described in 27.3.9 (Mathematical description of signals).
  i) Analog and RF: Upconvert the resulting complex baseband waveform associated with each transmit chain to an RF signal according to the carrier frequency of the desired channel and transmit. Refer to 27.3.9 (Mathematical description of signals) and 27.3.10 (HE preamble) for details.

The L-SIG field in the PPDU may be constructed from the following procedure.
  a) Set the RATE subfield in the SIGNAL field to 6 Mb/s. Set the LENGTH, Parity, and Tail fields in the SIGNAL field as described in 27.3.10.5 (L-SIG).
  b) BCC encoder: Encode the SIGNAL field by a convolutional encoder at the rate of R=½ as described in 27.3.11.5.1 (Binary convolutional coding and puncturing).
  c) BCC interleaver: Interleave as described in 17.3.5.7 (BCC interleavers).
  d) Constellation Mapper: BPSK modulate as described in 27.3.11.9 (Constellation mapping).
  e) Pilot insertion: Insert pilots as described in 27.3.10.5 (L-SIG).
  f) Extra tone insertion: Four extra tones are inserted in subcarriers k∈{−28, −27, 27, 28} for channel estimation purpose and the values on these four extra tones are {−1, −1, −1, 1}, respectively. Apply a 3 dB power boost to the four extra tones if transmitting an HE ER SU PPDU as described in 27.3.10.5 (L-SIG).
  g) Duplication and phase rotation: Duplicate the L-SIG field over each occupied 20 MHz subchannel of the channel bandwidth. Apply appropriate phase rotation for each occupied 20 MHz subchannel as described in 27.3.9 (Mathematical description of signals) and 21.3.7.5 (Definition of tone rotation).
  h) CSD per STS: If the TXVECTOR parameter BEAM_CHANGE is 0, apply CSD per STS for each space-time stream and frequency segment as described in 27.3.10.2.2 (Cyclic shift for HE modulated fields) before spatial mapping.
  i) Spatial mapping: If the TXVECTOR parameter BEAM_CHANGE is 0, apply the A matrix and Q matrix as described in 27.3.10.5 (L-SIG).
  j) IDFT: Compute the inverse discrete Fourier transform.
  k) CSD per chain: If the TXVECTOR parameter BEAM_CHANGE is 1 or not present, apply CSD per chain for each transmit chain and frequency segment as described in 27.3.10.2.1 (Cyclic shift for pre-HE modulated fields).
  l) Insert GI and apply windowing: Prepend a GI ($T_{GLPre\text{-}HE}$) and apply windowing as described in 27.3.9 (Mathematical description of signals).
  m) Analog and RF: Upconvert the resulting complex baseband waveform associated with each transmit chain. Refer to 27.3.9 (Mathematical description of signals) and 27.3.10 (HE preamble) for details.

In what follows, a VHT portion and cyclic shift values of the VHT format preamble will be described.

The VHT portion of the VHT format preamble consists of the VHT-SIG-A, VHT-STF, VHT-LTF, and VHT-SIG-B fields.

Cyclic shifts may be applied to pre-VHT modulated fields and VHT modulated fields.

First, cyclic shifts for the pre-VHT modulated fields may be applied to the L-STF, L-LTF, L-SIG, and VHT-SIG-A fields of the VHT PPDU. In other words, the cyclic shift value $T_{CS}^{iTX}$ for the L-STF, L-LTF, L-SIG, and VHT-SIG-A fields of the PPDU for transmit chain $i_{TX}$ out of a total of $N_{TX}$ may be defined as shown in the table below.

TABLE 11

$T_{CS}^{iTX}$ values for L-STF, L-LTF, L-SIG, and VHT-SIG-A fields of the PPDU

| Total number of transmit chain ($N_{TX}$) per frequency segment | Cyclic shift for transmit chain $i_{TX}$ (in units of ns) | | | | | | | |
|---|---|---|---|---|---|---|---|---|
| | 1 | 2 | 3 | 4 | 5 | 6 | 7 | 8 | >8 |
| 1 | 0 | — | — | — | — | — | — | — | — |
| 2 | 0 | −200 | — | — | — | — | — | — | — |
| 3 | 0 | −100 | −200 | — | — | — | — | — | — |
| 4 | 0 | −50 | −100 | −150 | — | — | — | — | — |
| 5 | 0 | −175 | −25 | −50 | −75 | — | — | — | — |
| 6 | 0 | −200 | −25 | −150 | −175 | −125 | — | — | — |
| 7 | 0 | −200 | −150 | −25 | −175 | −75 | −50 | — | — |
| 8 | 0 | −175 | −150 | −125 | −25 | −100 | −50 | −200 | — |
| >8 | 0 | −175 | −150 | −125 | −25 | −100 | −50 | −200 | Between −200 and 0 inclusive |

The L-STF field for 20 MHz transmission may be defined as follows.

$$S_{-26,26} = \sqrt{1/2}\{0,0,1+j,0,0,0,-1-j,0,0,0,1+j,0,0,0,-1-j,$$
$$0,0,0,-1-j,0,0,0,1+j,0,0,0,0,0,0,0,-1-j,$$
$$0,0,0,-1-j,0,0,0,1+j,0,0,0,1+j,0,0,0,1+j,$$
$$0,0,0,1+j,0,0\}$$

The L-STF field for 40 MHz transmission may be defined as follows.

$$S_{-58,58} = \sqrt{1/2}\{0,0,1+j,0,0,0,-1-j,0,0,0,1+j,0,0,0,-1-j,$$
$$0,0,0,-1-j,0,0,0,1+j,0,0,0,0,0,0,0,-1-j,$$
$$0,0,0,-1-j,0,0,0,1+j,0,0,0,1+j,0,0,0,1+j,$$
$$0,0,0,0,0,0,0,0,0,0,0,0,1+j,0,0,0,-1-j,$$
$$0,0,0,1+j,0,0,0,-1-j,0,0,0,-1-j,0,0,0,1+j,$$
$$0,0,0,0,-1-j,0,0,0,-1-j,0,0,0,1+j,0,0,0,1+j,$$
$$0,0,0,1+j,0,0,0,1+j,0,0\}$$

The L-STF field for 80 MHz transmission may be defined as follows.

$$S_{-122,122} = \{S_{-58,58},0,0,0,0,0,0,0,0,0,0,0,S_{-58,58}\}.$$

The L-STF field for 160 MHz transmission may be defined as follows.

$$S_{-250,250} = \{S_{-122,122},0,0,0,0,0,0,0,0,0,0,0,S_{-122,122}\}.$$

For 80+80 MHz transmission, each 80 MHz frequency segment has to use the L-STF Pattern ($S_{-122,122}$) for the 80 MHz transmission.

The time domain representation of the signal on a frequency segment $i_{seg}$ in a transmission chain $i_{TX}$ may be specified as follows.

$$r_{L-STF}^{(i_{Seg}, i_{TX})}(t) = \frac{1}{\sqrt{N_{L-STF}^{Tone} N_{TX}}} w_{T_{L-STF}}(t) \sum_{k=-N_{SR}}^{N_{SR}} \Upsilon_{k,BW} S_k \exp((j2\pi k\Delta)_F(t - T_{CS}^{i_{TX}})),$$

where $T_{CS}^{i_{TX}}$ represents the cyclic shift for transmit chain $i_{TX}$ with a value given in Table 21-10 (Cyclic shift values for L-STF, L-LTF, L-SIG, and VHT-SIG-A fields of the PPDU)

$\Upsilon_{k,BW}$ is defined by Equation (21-14), Equation (21-15), Equation (21-16), and Equation (21-17)

$N_{L-STF}^{Tone}$ has the value given in Table 21-8 (Tone scaling factor and guard interval duration values for PHY fields)

Cyclic shifts for VHT modulated fields may be applied to the VHT-STF, VHT-LTF, VHT-SIG-B, and data fields of the VHT PPDU. Cyclic shifts for pre-VHT modulated fields may be applied to the VHT-SIG-A field in the VHT format preamble.

Through the VHT modulated fields of the preamble, cyclic shifts may be applied to prevent unintended beamforming when correlated signals are transmitted to a plurality of space-time streams. The same cyclic shift may be applied to these streams during transmission of the data field of the VHT PPDU. The cyclic shift value $T_{CS,VHT}(n)$ for the VHT modulated fields for space-time stream n out of $N_{STS,total}$ total space-time streams may be defined as shown in the table below.

TABLE 12

$T_{CS,VHT}(n)$ values for the VHT modulated fields of a PPDU

| Total number of space-time streams ($N_{STS, total}$) | Cyclic shift for space-time stream n (ns) | | | | | | | |
|---|---|---|---|---|---|---|---|---|
| | 1 | 2 | 3 | 4 | 5 | 6 | 7 | 8 |
| 1 | 0 | — | — | — | — | — | — | — |
| 2 | 0 | −400 | — | — | — | — | — | — |
| 3 | 0 | −400 | −200 | — | — | — | — | — |
| 4 | 0 | −400 | −200 | −600 | — | — | — | — |
| 5 | 0 | −400 | −200 | −600 | −350 | — | — | — |
| 6 | 0 | −400 | −200 | −600 | −350 | −650 | — | — |
| 7 | 0 | −400 | −200 | −600 | −350 | −650 | −100 | — |
| 8 | 0 | −400 | −200 | −600 | −350 | −650 | −100 | −750 |

In a VHT MU PPDU, cyclic shifts may be applied sequentially across the space-time streams as follows. The cyclic shift of the space-time stream number m of user u is given by $T_{cs,VHT}(M_u+m)$ of the row corresponding to $N_{STS,total}$.

5. Technical Object of the Present Disclosure

EHT supports up to 16 spatial stream. At this time, a Cyclic Shift Delay (CSD) value that may be applied to the legacy portion of an EHT PPDU is proposed.

Cyclic Shift Delay (CSD) is used for preventing unintended beamforming, which is a shift value applied for each transmit chain or spatial stream or space-time stream.

Up to the 802.11ax, a total of 8 TX antennas and 8 spatial streams were supported; therefore, a CSD value for the legacy portion is defined only up to 8 as shown in Table 11 and is not defined for a case where the CSD value is larger than 8.

Since a maximum of 16 transmit chains may be used for the Extreme High Throughput (EHT) or 802.11be system, the present disclosure proposes a CSD value that may be applied to each transmit chain of the legacy portion.

5.1. CSD Value Candidates

CSD values used for the legacy portion (or non-EHT portion) have to be determined by values within 200 ns to satisfy backward compatibility with legacy devices.

A set of CSD value candidates corresponding to 16 transmit chains may be [−12.5, −25, −37.5, −50, −62.5, −75, −87.5, −100, −112.5, −125, −137.5, −150, −167.5, −175, −187.5, −200] (in units of ns). Since the cyclic shift value of the first transmit chain is 0, 0 is excluded from the set of candidates.

5.2. Additional Definition of CSD Values for 9 to 16 Transmit Chains

The present disclosure considers a method for defining CSD values for 9 to 16 transmit chains in addition to the values defined previously.

A nested structure is also employed for this process. In other words, a CSD table for the case where a total number of transmit chains is 9 is constructed so as to include a CSD table for the case where a total number of transmit chains is 8, and a CSD table for the case where a total number of transmit chains is 10 is constructed so as to include a CSD table for the case where a total number of transmit chains is 9.

Table 11 above defines the CSD value only up to the case where a total number of transmit chains is 8. The CSD values when the number of transmit chains of Table 11 is 9 to 16 may be defined additionally.

At this time, the CSD value of the first transmit chain is fixed to 0. For the remaining transmit chains, cyclic shift values in the candidate set are selected. Since the CSD values used for 1 to 8 transmit chains are not available, if these values are excluded, a set of available values may become [−12.5, −37.5, −62.5, −75, −87.5, −112.5, −137.5, −167.5, −187.5].

The CSD value when a total number of transmit chains is 9 are shown in the table below, and the CSD value of the 9th transmit chain has to be determined (in Table 13 below, the CSD value of the 9th transmit chain is not specified).

TABLE 13

| Total number of transmit chains per frequency segment | Cyclic Shift for transmit chain $i_{TX}$ (in units of ns) | | | | | | | | |
|---|---|---|---|---|---|---|---|---|---|
| | 1 | 2 | 3 | 4 | 5 | 6 | 7 | 8 | 9 |
| 9 | 0 | −175 | −150 | −125 | −25 | −100 | −50 | −200 | |

5.3. Criteria for Determining CSD Values

Figure 15:
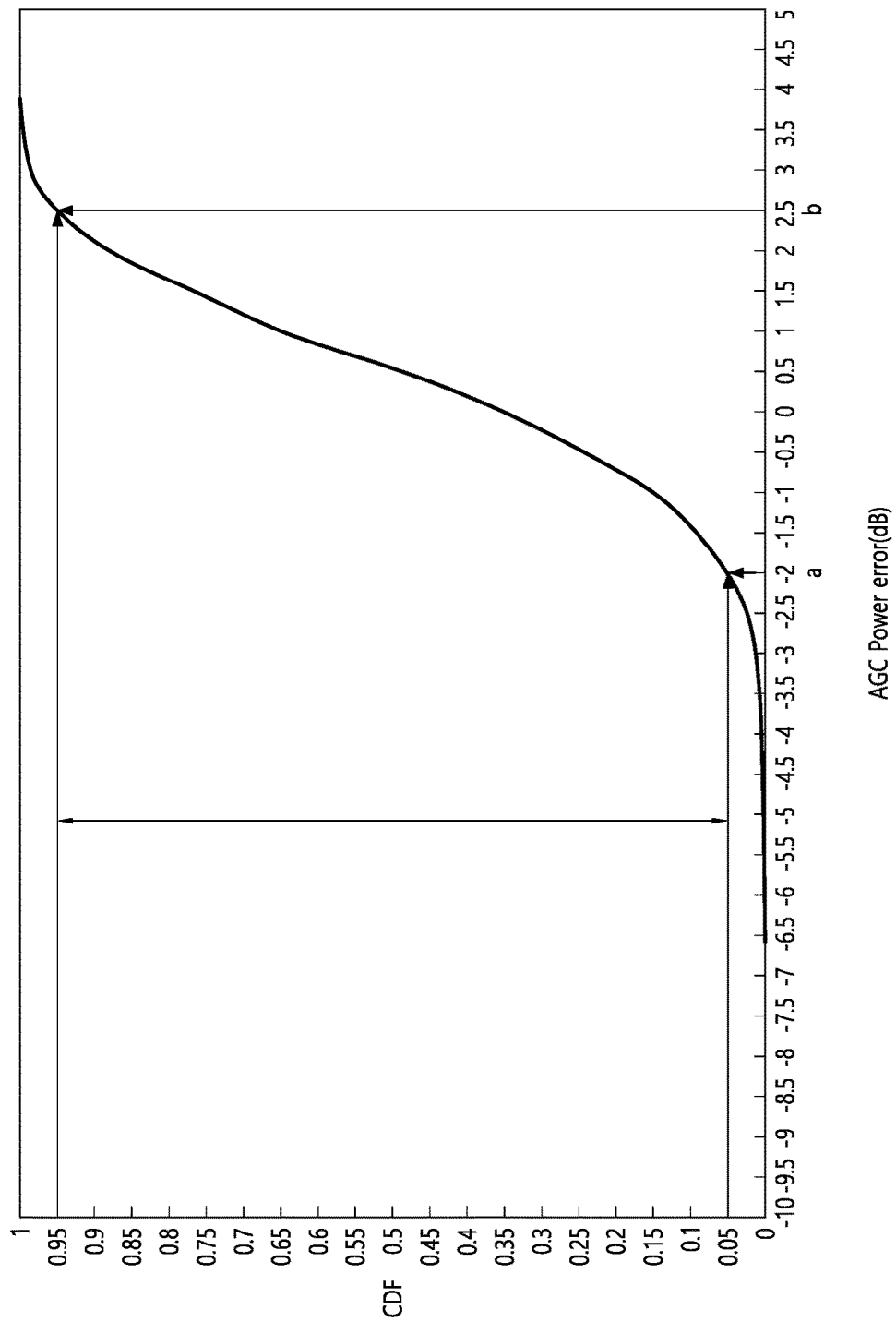
FIG. 15 is a graph used for determining a CSD value based on criterion 1).
Figure 16:
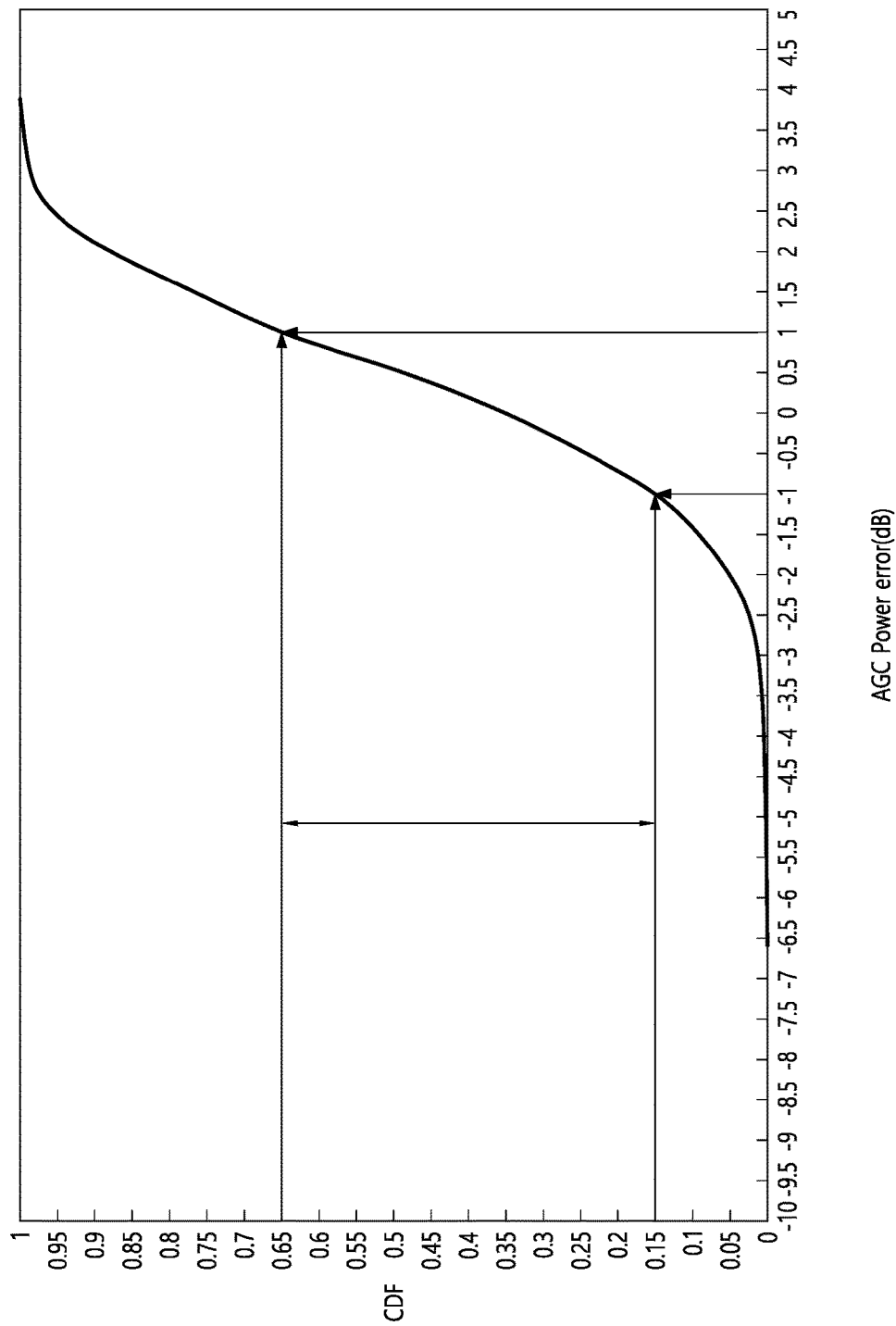
FIG. 16 is a graph used for determining a CSD value based on criterion 2).
Figure 17:
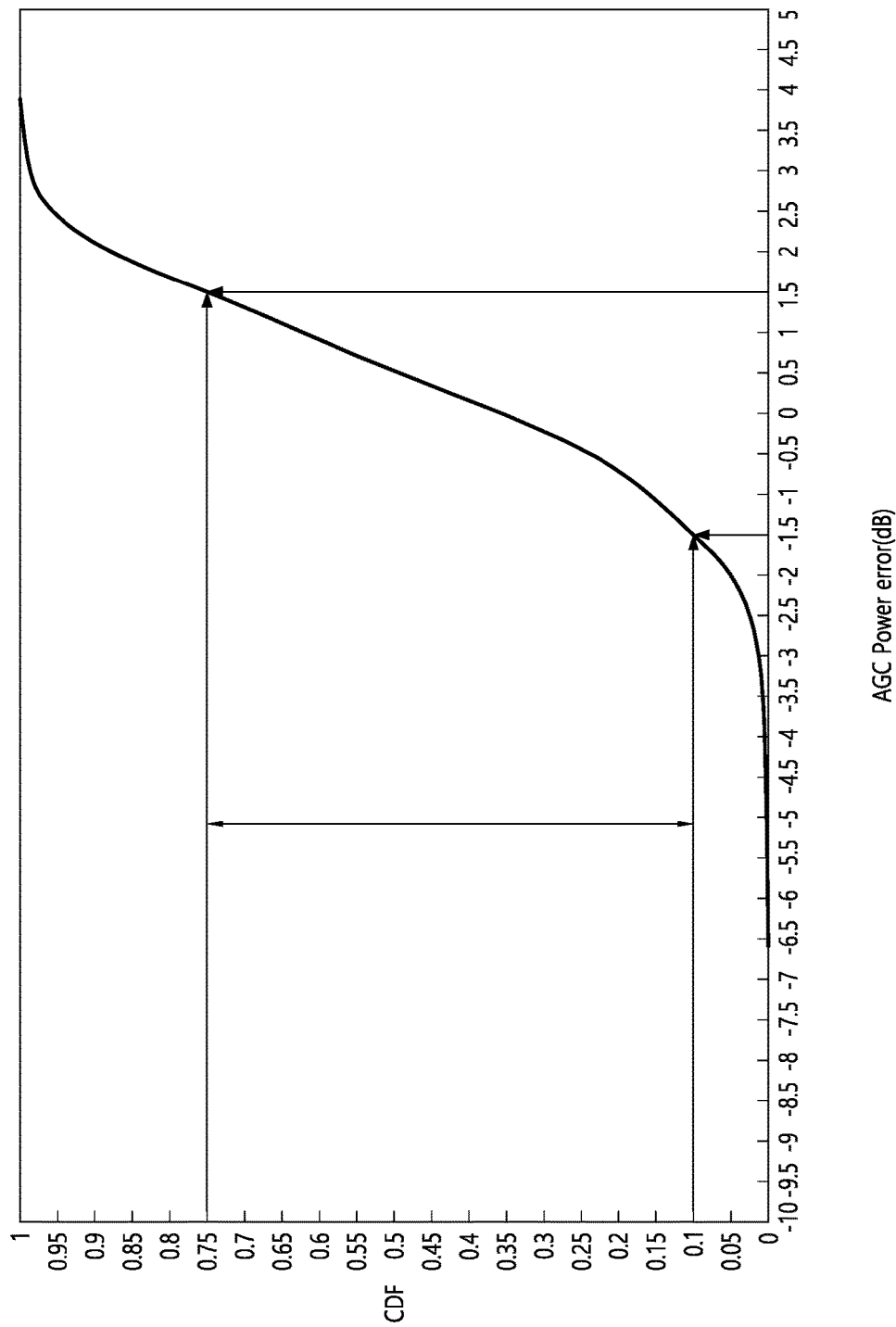
FIG. 17 is a graph used for determining a CSD value based on criterion 3).

In determining the CSD, CSD values that minimize a difference between reception powers of the L-STF and data fields are considered. In other words, a metric for determining the CSD value may be a ratio of the received L-STF power to the received Data power. FIGS. 15 to 17 described later show graphs illustrating Cumulative Distribution Functions (CDFs) with respect to Automatic Gain Control (AGC) power error.

All of the values belonging to the set of available values are input to the CSD value for the 9th transmit chain, and the CSD value is determined according to a criterion. (The set of available values=[−12.5, −37.5, −62.5, −75, −87.5, −112.5, −137.5, −167.5, −187.5].)

The criteria for determining the CSD value are shown in 1) to 3) below. Based on the criteria 1) to 3) below, a CSD value of the 9th transmit chain is determined, after which CSD values of the 10th, 11th, . . . , and 16th transmit chains are determined. In determining the CSD values, various channel models are considered (TGnB, TGnC, TGnD, and TGnE).

Five delay profile models (channel models A to E) with respect to different environments are proposed for WLAN channel models (or Task Group (TGn) channel model).

When the 9th CSD value is determined as −12.5 ns, the optimal CSD value of the 10th transmit chain that may be obtained according to the criterion above is −37.5.

When the 9th and 10th CSD values are determined as above, the optimal CSD value of the 11th transmit chain is obtained as −187.5 ns.

When the 9th, 10th, and 11th CSD values are determined as above, the optimal CSD value of the 12th transmit chain is obtained as −87.5 ns.

When the 9th, 10th, 11th, and 12th CSD values are determined as above, the optimal CSD value of the 13th transmit chain is obtained as −162.5 ns.

When the 9th, 10th, 11th, 12th, and 13th CSD values are determined as above, the optimal CSD value of the 14th transmit chain is obtained as −112.5 ns.

When the 9th, 10th, 11th, 12th, 13th, and 14th CSD values are determined as above, the optimal CSD value of the 15th transmit chain is obtained as −62.5 ns.

When the 9th, 10th, 11th, 12th, 13th, 14th, and 15th CSD values are determined as above, the optimal CSD value of the 16th transmit chain is obtained as −75 ns.

A CSD table according to a total number of transmit chains is shown below. The table shows optimal CSD values of the 9th to 16th transmit chains obtained according to the criterion 1).

TABLE 14

| Total number of transmit chains per frequency segment | Cyclic Shift for transmit chain $i_{TX}$ (in units of ns) | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 9  | 0 | −175 | −150 | −125 | −25 | −100 | −50 | −200 | −12.5 | —     | —      | —     | —      | —      | —     | —   |
| 10 | 0 | −175 | −150 | −125 | −25 | −100 | −50 | −200 | −12.5 | −37.5 | —      | —     | —      | —      | —     | —   |
| 11 | 0 | −175 | −150 | −125 | −25 | −100 | −50 | −200 | −12.5 | −37.5 | −187.5 | —     | —      | —      | —     | —   |
| 12 | 0 | −175 | −150 | −125 | −25 | −100 | −50 | −200 | −12.5 | −37.5 | −187.5 | −87.5 | —      | —      | —     | —   |
| 13 | 0 | −175 | −150 | −125 | −25 | −100 | −50 | −200 | −12.5 | −37.5 | −187.5 | −87.5 | −162.5 | —      | —     | —   |
| 14 | 0 | −175 | −150 | −125 | −25 | −100 | −50 | −200 | −12.5 | −37.5 | −187.5 | −87.5 | −162.5 | −112.5 | —     | —   |
| 15 | 0 | −175 | −150 | −125 | −25 | −100 | −50 | −200 | −12.5 | −37.5 | −187.5 | −87.5 | −162.5 | −112.5 | −62.5 | —   |
| 16 | 0 | −175 | −150 | −125 | −25 | −100 | −50 | −200 | −12.5 | −37.5 | −187.5 | −87.5 | −162.5 | −112.5 | −62.5 | −75 |

Channel model A: A model for a typical office environment, Non-Line-Of-Sight (NLOS) condition, and 50 ns rms delay diffusion.

Channel model B: A model for a typical large open space and office environment, NLOS condition, and 100 ns rms delay diffusion.

Channel model C: A model for a large open space (indoor and outdoor), NLOS condition, and 150 ns rms delay diffusion.

Channel model D: The same model as the model C except for the Line-Of-Sight (LOS) condition and 140 ns rms delay diffusion (a Ricean K-factor of 10 dB in the first delay).

Channel model E: A model for a typical large open space (indoor and outdoor), NLOS condition, and 250 ns rms delay diffusion.

1) The CSD Value that Minimizes Abs(a)+Abs(b) when a Value Corresponding to 5% of a CDF is Denoted by a and a Value Corresponding to 95% of the CDF is Denoted by b (Criterion 1)

FIG. 15 is a graph used for determining a CSD value based on criterion 1).

a) Channel B

The optimal CSD value of the 9th transmit chain that may be obtained from the metric of the criterion 1) is −12.5 ns.

b) Channel C

The optimal CSD value of the 9th transmit chain that may be obtained from the metric of the criterion 1) is −137.5 ns.

When the 9th CSD value is determined as −137.5 ns, the optimal CSD value of the 10th transmit chain that may be obtained according to the criterion above is −162.5 ns.

When the 9th and 10th CSD values are determined as above, the optimal CSD value of the 11th transmit chain is obtained as −12.5 ns.

When the 9th, 10th, and 11th CSD values are determined as above, the optimal CSD value of the 12th transmit chain is obtained as −62.5 ns.

When the 9th, 10th, 11th, and 12th CSD values are determined as above, the optimal CSD value of the 13th transmit chain is obtained as −75 ns.

When the 9th, 10th, 11th, 12th, and 13th CSD values are determined as above, the optimal CSD value of the 14th transmit chain is obtained as −187.5 ns.

When the 9th, 10th, 11th, 12th, 13th, and 14th CSD values are determined as above, the optimal CSD value of the 15th transmit chain is obtained as −87.5 ns.

When the 9th, 10th, 11th, 12th, 13th, 14th, and 15th CSD values are determined as above, the optimal CSD value of the 16th transmit chain is obtained as −37.5 ns.

A CSD table according to a total number of transmit chains is shown below. The table shows optimal CSD values of the 9th to 16th transmit chains obtained according to the criterion 1).

TABLE 15

| Total number of transmit chains per frequency segment | Cyclic Shift for transmit chain $i_{TX}$ (in units of ns) | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 9  | 0 | −175 | −150 | −125 | −25 | −100 | −50 | −200 | −137.5 | — | — | — | — | — | — | — |
| 10 | 0 | −175 | −150 | −125 | −25 | −100 | −50 | −200 | −137.5 | −162.5 | — | — | — | — | — | — |
| 11 | 0 | −175 | −150 | −125 | −25 | −100 | −50 | −200 | −137.5 | −162.5 | −12.5 | — | — | — | — | — |
| 12 | 0 | −175 | −150 | −125 | −25 | −100 | −50 | −200 | −137.5 | −162.5 | −12.5 | −62.5 | — | — | — | — |
| 13 | 0 | −175 | −150 | −125 | −25 | −100 | −50 | −200 | −137.5 | −162.5 | −12.5 | −62.5 | −75 | — | — | — |
| 14 | 0 | −175 | −150 | −125 | −25 | −100 | −50 | −200 | −137.5 | −162.5 | −12.5 | −62.5 | −75 | −187.5 | — | — |
| 15 | 0 | −175 | −150 | −125 | −25 | −100 | −50 | −200 | −137.5 | −162.5 | −12.5 | −62.5 | −75 | −187.5 | −87.5 | — |
| 16 | 0 | −175 | −150 | −125 | −25 | −100 | −50 | −200 | −137.5 | −162.5 | −12.5 | −62.5 | −75 | −187.5 | −87.5 | −37.5 | c) Channel D

The optimal CSD value of the 9th transmit chain that may be obtained from the metric of the criterion 1) is −12.5 ns.

When the 9th CSD value is determined as −12.5 ns, the optimal CSD value of the 10th transmit chain that may be obtained according to the criterion above is −62.5 ns.

When the 9th and 10th CSD values are determined as above, the optimal CSD value of the 11th transmit chain is obtained as −162.5 ns.

When the 9th, 10th, and 11th CSD values are determined as above, the optimal CSD value of the 12th transmit chain is obtained as −37.5 ns.

When the 9th, 10th, 11th, and 12th CSD values are determined as above, the optimal CSD value of the 13th transmit chain is obtained as −112.5 ns.

When the 9th, 10th, 11th, 12th, and 13th CSD values are determined as above, the optimal CSD value of the 14th transmit chain is obtained as −187.5 ns.

When the 9th, 10th, 11th, 12th, 13th, and 14th CSD values are determined as above, the optimal CSD value of the 15th transmit chain is obtained as −75 ns.

When the 9th, 10th, 11th, 12th, 13th, 14th, and 15th CSD values are determined as above, the optimal CSD value of the 16th transmit chain is obtained as −87.5 ns.

A CSD table according to a total number of transmit chains is shown below. The table shows optimal CSD values of the 9th to 16th transmit chains obtained according to the criterion 1).

d) Channel E

The optimal CSD value of the 9th transmit chain that may be obtained from the metric of the criterion 1) is −37.5 ns.

When the 9th CSD value is determined as −37.5 ns, the optimal CSD value of the 10th transmit chain that may be obtained according to the criterion above is −187.5 ns.

When the 9th and 10th CSD values are determined as above, the optimal CSD value of the 11th transmit chain is obtained as −137.5 ns.

When the 9th, 10th, and 11th CSD values are determined as above, the optimal CSD value of the 12th transmit chain is obtained as −12.5 ns.

When the 9th, 10th, 11th, and 12th CSD values are determined as above, the optimal CSD value of the 13th transmit chain is obtained as −75 ns.

When the 9th, 10th, 11th, 12th, and 13th CSD values are determined as above, the optimal CSD value of the 14th transmit chain is obtained as −62.5 ns.

When the 9th, 10th, 11th, 12th, 13th, and 14th CSD values are determined as above, the optimal CSD value of the 15th transmit chain is obtained as −87.5 ns.

When the 9th, 10th, 11th, 12th, 13th, 14th, and 15th CSD values are determined as above, the optimal CSD value of the 16th transmit chain is obtained as −162.5 ns.

A CSD table according to a total number of transmit chains is shown below. The table shows optimal CSD values of the 9th to 16th transmit chains obtained according to the criterion 1).

TABLE 16

| Total number of transmit chains per frequency segment | Cyclic Shift for transmit chain $i_{TX}$ (in units of ns) | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 9  | 0 | −175 | −150 | −125 | −25 | −100 | −50 | −200 | −12.5 | — | — | — | — | — | — | — |
| 10 | 0 | −175 | −150 | −125 | −25 | −100 | −50 | −200 | −12.5 | −62.5 | — | — | — | — | — | — |
| 11 | 0 | −175 | −150 | −125 | −25 | −100 | −50 | −200 | −12.5 | −62.5 | −162.5 | — | — | — | — | — |
| 12 | 0 | −175 | −150 | −125 | −25 | −100 | −50 | −200 | −12.5 | −62.5 | −162.5 | −37.5 | — | — | — | — |
| 13 | 0 | −175 | −150 | −125 | −25 | −100 | −50 | −200 | −12.5 | −62.5 | −162.5 | −37.5 | −112.5 | — | — | — |
| 14 | 0 | −175 | −150 | −125 | −25 | −100 | −50 | −200 | −12.5 | −62.5 | −162.5 | −37.5 | −112.5 | −187.5 | — | — |
| 15 | 0 | −175 | −150 | −125 | −25 | −100 | −50 | −200 | −12.5 | −62.5 | −162.5 | −37.5 | −112.5 | −187.5 | −75 | — |
| 16 | 0 | −175 | −150 | −125 | −25 | −100 | −50 | −200 | −12.5 | −62.5 | −162.5 | −37.5 | −112.5 | −187.5 | −75 | −87.5 |

TABLE 17

| Total number of transmit chains per frequency segment | Cyclic Shift for transmit chains $i_{TX}$ (in unit of ns) | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 9 | 0 | −175 | −150 | −125 | −25 | −100 | −50 | −200 | −37.5 | — | — | — | — | — | — | — |
| 10 | 0 | −175 | −150 | −125 | −25 | −100 | −50 | −200 | −37.5 | −187.5 | — | — | — | — | — | — |
| 11 | 0 | −175 | −150 | −125 | −25 | −100 | −50 | −200 | −37.5 | −187.5 | −137.5 | — | — | — | — | — |
| 12 | 0 | −175 | −150 | −125 | −25 | −100 | −50 | −200 | −37.5 | −187.5 | −137.5 | −12.5 | — | — | — | — |
| 13 | 0 | −175 | −150 | −125 | −25 | −100 | −50 | −200 | −37.5 | −187.5 | −137.5 | −12.5 | −75 | — | — | — |
| 14 | 0 | −175 | −150 | −125 | −25 | −100 | −50 | −200 | −37.5 | −187.5 | −137.5 | −12.5 | −75 | −62.5 | — | — |
| 15 | 0 | −175 | −150 | −125 | −25 | −100 | −50 | −200 | −37.5 | −187.5 | −137.5 | −12.5 | −75 | −62.5 | −87.5 | — |
| 16 | 0 | −175 | −150 | −125 | −25 | −100 | −50 | −200 | −37.5 | −187.5 | −137.5 | −12.5 | −75 | −62.5 | −87.5 | −162.5 |

2) The CSD Value that Maximizes the Proportion of the Ratio of L-STF Power to Data Power being Distributed within a Range from −1 dB to 1 dB (Criterion 2)

FIG. 16 is a graph used for determining a CSD value based on criterion 2).

a) Channel B

The optimal CSD value of the 9th transmit chain that may be obtained from the metric of the criterion 2) is −12.5 ns.

When the 9th CSD value is determined as −12.5 ns, the optimal CSD value of the 10th transmit chain that may be obtained according to the criterion above is −162.5 ns.

When the 9th and 10th CSD values are determined as above, the optimal CSD value of the 11th transmit chain is obtained as −187.5 ns.

When the 9th, 10th, and 11th CSD values are determined as above, the optimal CSD value of the 12th transmit chain is obtained as −112.5 ns.

When the 9th, 10th, 11th, and 12th CSD values are determined as above, the optimal CSD value of the 13th transmit chain is obtained as −87.5 ns.

When the 9th, 10th, 11th, 12th, and 13th CSD values are determined as above, the optimal CSD value of the 14th transmit chain is obtained as −75 ns.

When the 9th, 10th, 11th, 12th, 13th, and 14th CSD values are determined as above, the optimal CSD value of the 15th transmit chain is obtained as −137.5 ns.

When the 9th, 10th, 11th, 12th, 13th, 14th, and 15th CSD values are determined as above, the optimal CSD value of the 16th transmit chain is obtained as −62.5 ns.

A CSD table according to a total number of transmit chains is shown below. The table shows optimal CSD values of the 9th to 16th transmit chains obtained according to the criterion 2).

b) Channel C

The optimal CSD value of the 9th transmit chain that may be obtained from the metric of the criterion 2) is −137.5 ns.

When the 9th CSD value is determined as −137.5 ns, the optimal CSD value of the 10th transmit chain that may be obtained according to the criterion above is −162.5 ns.

When the 9th and 10th CSD values are determined as above, the optimal CSD value of the 11th transmit chain is obtained as −87.5 ns.

When the 9th, 10th, and 11th CSD values are determined as above, the optimal CSD value of the 12th transmit chain is obtained as −187.5 ns.

When the 9th, 10th, 11th, and 12th CSD values are determined as above, the optimal CSD value of the 13th transmit chain is obtained as −12.5 ns.

When the 9th, 10th, 11th, 12th, and 13th CSD values are determined as above, the optimal CSD value of the 14th transmit chain is obtained as −75 ns.

When the 9th, 10th, 11th, 12th, 13th, and 14th CSD values are determined as above, the optimal CSD value of the 15th transmit chain is obtained as −112.5 ns.

When the 9th, 10th, 11th, 12th, 13th, 14th, and 15th CSD values are determined as above, the optimal CSD value of the 16th transmit chain is obtained as −37.5 ns.

A CSD table according to a total number of transmit chains is shown below. The table shows optimal CSD values of the 9th to 16th transmit chains obtained according to the criterion 2).

TABLE 18

| Total number of transmit chains per frequency segment | Cyclic Shift for transmit chains $i_{TX}$ (in unit of ns) | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 9 | 0 | −175 | −150 | −125 | −25 | −100 | −50 | −200 | −12.5 | — | — | — | — | — | — | — |
| 10 | 0 | −175 | −150 | −125 | −25 | −100 | −50 | −200 | −12.5 | −162.5 | — | — | — | — | — | — |
| 11 | 0 | −175 | −150 | −125 | −25 | −100 | −50 | −200 | −12.5 | −162.5 | −187.5 | — | — | — | — | — |
| 12 | 0 | −175 | −150 | −125 | −25 | −100 | −50 | −200 | −12.5 | −162.5 | −187.5 | −112.5 | — | — | — | — |
| 13 | 0 | −175 | −150 | −125 | −25 | −100 | −50 | −200 | −12.5 | −162.5 | −187.5 | −112.5 | −85.7 | — | — | — |
| 14 | 0 | −175 | −150 | −125 | −25 | −100 | −50 | −200 | −12.5 | −162.5 | −187.5 | −112.5 | −85.7 | −75 | — | — |
| 15 | 0 | −175 | −150 | −125 | −25 | −100 | −50 | −200 | −12.5 | −162.5 | −187.5 | −112.5 | −85.7 | −75 | −137.5 | — |
| 16 | 0 | −175 | −150 | −125 | −25 | −100 | −50 | −200 | −12.5 | −162.5 | −187.5 | −112.5 | −85.7 | −75 | −137.5 | −62.5 |

TABLE 19

| Total number of transmit chains per frequency segment | Cyclic Shift for transmit chains $i_{TX}$ (in unit of ns) | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 9  | 0 | −175 | −150 | −125 | −25 | −100 | −50 | −200 | −137.5 | —      | —    | —      | —     | —   | —      | —     |
| 10 | 0 | −175 | −150 | −125 | −25 | −100 | −50 | −200 | −137.5 | −162.5 | —    | —      | —     | —   | —      | —     |
| 11 | 0 | −175 | −150 | −125 | −25 | −100 | −50 | −200 | −137.5 | −162.5 | −87.5 | —     | —     | —   | —      | —     |
| 12 | 0 | −175 | −150 | −125 | −25 | −100 | −50 | −200 | −137.5 | −162.5 | −87.5 | −187.5 | —    | —   | —      | —     |
| 13 | 0 | −175 | −150 | −125 | −25 | −100 | −50 | −200 | −137.5 | −162.5 | −87.5 | −187.5 | −12.5 | —   | —      | —     |
| 14 | 0 | −175 | −150 | −125 | −25 | −100 | −50 | −200 | −137.5 | −162.5 | −87.5 | −187.5 | −12.5 | −75 | —      | —     |
| 15 | 0 | −175 | −150 | −125 | −25 | −100 | −50 | −200 | −137.5 | −162.5 | −87.5 | −187.5 | −12.5 | −75 | −112.5 | —     |
| 16 | 0 | −175 | −150 | −125 | −25 | −100 | −50 | −200 | −137.5 | −162.5 | −87.5 | −187.5 | −12.5 | −75 | −112.5 | −37.5 | c) Channel D

The optimal CSD value of the 9th transmit chain that may be obtained from the metric of the criterion 2) is −37.5 ns.

When the 9th CSD value is determined as −37.5 ns, the optimal CSD value of the 10th transmit chain that may be obtained according to the criterion above is −62.5 ns.

When the 9th and 10th CSD values are determined as above, the optimal CSD value of the 11th transmit chain is obtained as −162.5 ns.

When the 9th, 10th, and 11th CSD values are determined as above, the optimal CSD value of the 12th transmit chain is obtained as −75 ns.

When the 9th, 10th, 11th, and 12th CSD values are determined as above, the optimal CSD value of the 13th transmit chain is obtained as −12.5 ns.

When the 9th, 10th, 11th, 12th, and 13th CSD values are determined as above, the optimal CSD value of the 14th transmit chain is obtained as −112.5 ns.

When the 9th, 10th, 11th, 12th, 13th, and 14th CSD values are determined as above, the optimal CSD value of the 15th transmit chain is obtained as −187.5 ns.

When the 9th, 10th, 11th, 12th, 13th, 14th, and 15th CSD values are determined as above, the optimal CSD value of the 16th transmit chain is obtained as −137.5 ns.

A CSD table according to a total number of transmit chains is shown below. The table shows optimal CSD values of the 9th to 16th transmit chains obtained according to the criterion 2).

d) Channel E

The optimal CSD value of the 9th transmit chain that may be obtained from the metric of the criterion 2) is −137.5 ns.

When the 9th CSD value is determined as −137.5 ns, the optimal CSD value of the 10th transmit chain that may be obtained according to the criterion above is −162.5 ns.

When the 9th and 10th CSD values are determined as above, the optimal CSD value of the 11th transmit chain is obtained as −37.5 ns.

When the 9th, 10th, and 11th CSD values are determined as above, the optimal CSD value of the 12th transmit chain is obtained as −112.5 ns.

When the 9th, 10th, 11th, and 12th CSD values are determined as above, the optimal CSD value of the 13th transmit chain is obtained as −87.5 ns.

When the 9th, 10th, 11th, 12th, and 13th CSD values are determined as above, the optimal CSD value of the 14th transmit chain is obtained as −75 ns.

When the 9th, 10th, 11th, 12th, 13th, and 14th CSD values are determined as above, the optimal CSD value of the 15th transmit chain is obtained as −187.5 ns.

When the 9th, 10th, 11th, 12th, 13th, 14th, and 15th CSD values are determined as above, the optimal CSD value of the 16th transmit chain is obtained as −62.5 ns.

A CSD table according to a total number of transmit chains is shown below. The table shows optimal CSD values of the 9th to 16th transmit chains obtained according to the criterion 2).

TABLE 20

| Total number of transmit chains per frequency segment | Cyclic Shift for transmit chains $i_{TX}$ (in unit of ns) | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 9  | 0 | −175 | −150 | −125 | −25 | −100 | −50 | −200 | −37.5 | —     | —      | —   | —     | —      | —      | —      |
| 10 | 0 | −175 | −150 | −125 | −25 | −100 | −50 | −200 | −37.5 | −62.5 | —      | —   | —     | —      | —      | —      |
| 11 | 0 | −175 | −150 | −125 | −25 | −100 | −50 | −200 | −37.5 | −62.5 | −162.5 | —   | —     | —      | —      | —      |
| 12 | 0 | −175 | −150 | −125 | −25 | −100 | −50 | −200 | −37.5 | −62.5 | −162.5 | −75 | —     | —      | —      | —      |
| 13 | 0 | −175 | −150 | −125 | −25 | −100 | −50 | −200 | −37.5 | −62.5 | −162.5 | −75 | −12.5 | —      | —      | —      |
| 14 | 0 | −175 | −150 | −125 | −25 | −100 | −50 | −200 | −37.5 | −62.5 | −162.5 | −75 | −12.5 | −112.5 | —      | —      |
| 15 | 0 | −175 | −150 | −125 | −25 | −100 | −50 | −200 | −37.5 | −62.5 | −162.5 | −75 | −12.5 | −112.5 | −187.5 | —      |
| 16 | 0 | −175 | −150 | −125 | −25 | −100 | −50 | −200 | −37.5 | −62.5 | −162.5 | −75 | −12.5 | −112.5 | −187.5 | −137.5 |

TABLE 21

| Total number of transmit chains per frequency segment | Cyclic Shift for transmit chains $i_{TX}$ (in unit of ns) | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 9  | 0 | −175 | −150 | −125 | −25 | −100 | −50 | −200 | −137.5 | — | — | — | — | — | — | — |
| 10 | 0 | −175 | −150 | −125 | −25 | −100 | −50 | −200 | −137.5 | −162.5 | — | — | — | — | — | — |
| 11 | 0 | −175 | −150 | −125 | −25 | −100 | −50 | −200 | −137.5 | −162.5 | −37.5 | — | — | — | — | — |
| 12 | 0 | −175 | −150 | −125 | −25 | −100 | −50 | −200 | −137.5 | −162.5 | −37.5 | −112.5 | — | — | — | — |
| 13 | 0 | −175 | −150 | −125 | −25 | −100 | −50 | −200 | −137.5 | −162.5 | −37.5 | −112.5 | −87.5 | — | — | — |
| 14 | 0 | −175 | −150 | −125 | −25 | −100 | −50 | −200 | −137.5 | −162.5 | −37.5 | −112.5 | −87.5 | −75 | — | — |
| 15 | 0 | −175 | −150 | −125 | −25 | −100 | −50 | −200 | −137.5 | −162.5 | −37.5 | −112.5 | −87.5 | −75 | −187.5 | — |
| 16 | 0 | −175 | −150 | −125 | −25 | −100 | −50 | −200 | −137.5 | −162.5 | −37.5 | −112.5 | −87.5 | −75 | −187.5 | −62.5 |

3) The CSD Value that Maximizes the Proportion of the Ratio of L-STF Power to Data Power being Distributed within a Range from −1.5 dB to 1.5 dB (Criterion 3)

FIG. 17 is a graph used for determining a CSD value based on criterion 3).

a) Channel B

The optimal CSD value of the 9th transmit chain that may be obtained from the metric of the criterion 3) is −12.5 ns.

When the 9th CSD value is determined as −12.5 ns, the optimal CSD value of the 10th transmit chain that may be obtained according to the criterion above is −37.5 ns.

When the 9th and 10th CSD values are determined as above, the optimal CSD value of the 11th transmit chain is obtained as −112.5 ns.

When the 9th, 10th, and 11th CSD values are determined as above, the optimal CSD value of the 12th transmit chain is obtained as −187.5 ns.

When the 9th, 10th, 11th, and 12th CSD values are determined as above, the optimal CSD value of the 13th transmit chain is obtained as −162.5 ns.

When the 9th, 10th, 11th, 12th, and 13th CSD values are determined as above, the optimal CSD value of the 15th transmit chain is obtained as −87.5 ns.

When the 9th, 10th, 11th, 12th, 13th, and 14th CSD values are determined as above, the optimal CSD value of the 15th transmit chain is obtained as −75 ns.

When the 9th, 10th, 11th, 12th, 13th, 14th, and 15th CSD values are determined as above, the optimal CSD value of the 16th transmit chain is obtained as −137.5 ns.

A CSD table according to a total number of transmit chains is shown below. The table shows optimal CSD values of the 9th to 16th transmit chains obtained according to the criterion 3).

b) Channel C

The optimal CSD value of the 9th transmit chain that may be obtained from the metric of the criterion 3) is −137.5 ns.

When the 9th CSD value is determined as −137.5 ns, the optimal CSD value of the 10th transmit chain that may be obtained according to the criterion above is −162.5 ns.

When the 9th and 10th CSD values are determined as above, the optimal CSD value of the 11th transmit chain is obtained as −187.5 ns.

When the 9th, 10th, and 11th CSD values are determined as above, the optimal CSD value of the 12th transmit chain is obtained as −12.5 ns.

When the 9th, 10th, 11th, and 12th CSD values are determined as above, the optimal CSD value of the 13th transmit chain is obtained as −75 ns.

When the 9th, 10th, 11th, 12th, and 13th CSD values are determined as above, the optimal CSD value of the 15th transmit chain is obtained as −112.5 ns.

When the 9th, 10th, 11th, 12th, 13th, and 14th CSD values are determined as above, the optimal CSD value of the 15th transmit chain is obtained as −37.5 ns.

When the 9th, 10th, 11th, 12th, 13th, 14th, and 15th CSD values are determined as above, the optimal CSD value of the 16th transmit chain is obtained as −62.5 ns.

A CSD table according to a total number of transmit chains is shown below. The table shows optimal CSD values of the 9th to 16th transmit chains obtained according to the criterion 3).

TABLE 22

| Total number of transmit chains per frequency segment | Cyclic Shift for transmit chains $i_{TX}$ (in unit of ns) | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 9  | 0 | −175 | −150 | −125 | −25 | −100 | −50 | −200 | −12.5 | — | — | — | — | — | — | — |
| 10 | 0 | −175 | −150 | −125 | −25 | −100 | −50 | −200 | −12.5 | −37.5 | — | — | — | — | — | — |
| 11 | 0 | −175 | −150 | −125 | −25 | −100 | −50 | −200 | −12.5 | −37.5 | −112.5 | — | — | — | — | — |
| 12 | 0 | −175 | −150 | −125 | −25 | −100 | −50 | −200 | −12.5 | −37.5 | −112.5 | −187.5 | — | — | — | — |
| 13 | 0 | −175 | −150 | −125 | −25 | −100 | −50 | −200 | −12.5 | −37.5 | −112.5 | −187.5 | −162.5 | — | — | — |
| 14 | 0 | −175 | −150 | −125 | −25 | −100 | −50 | −200 | −12.5 | −37.5 | −112.5 | −187.5 | −162.5 | −87.5 | — | — |
| 15 | 0 | −175 | −150 | −125 | −25 | −100 | −50 | −200 | −12.5 | −37.5 | −112.5 | −187.5 | −162.5 | −87.5 | −75 | — |
| 16 | 0 | −175 | −150 | −125 | −25 | −100 | −50 | −200 | −12.5 | −37.5 | −112.5 | −187.5 | −162.5 | −87.5 | −75 | −137.5 |

TABLE 23

| Total number of transmit chains per frequency segment | Cyclic Shift for transmit chains $i_{TX}$ (in unit of ns) | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 9  | 0 | −175 | −150 | −125 | −25 | −100 | −50 | −200 | −137.5 | — | — | — | — | — | — | — |
| 10 | 0 | −175 | −150 | −125 | −25 | −100 | −50 | −200 | −137.5 | −162.5 | — | — | — | — | — | — |
| 11 | 0 | −175 | −150 | −125 | −25 | −100 | −50 | −200 | −137.5 | −162.5 | −187.5 | — | — | — | — | — |
| 12 | 0 | −175 | −150 | −125 | −25 | −100 | −50 | −200 | −137.5 | −162.5 | −187.5 | −12.5 | — | — | — | — |
| 13 | 0 | −175 | −150 | −125 | −25 | −100 | −50 | −200 | −137.5 | −162.5 | −187.5 | −12.5 | −75 | — | — | — |
| 14 | 0 | −175 | −150 | −125 | −25 | −100 | −50 | −200 | −137.5 | −162.5 | −187.5 | −12.5 | −75 | −112.5 | — | — |
| 15 | 0 | −175 | −150 | −125 | −25 | −100 | −50 | −200 | −137.5 | −162.5 | −187.5 | −12.5 | −75 | −112.5 | −37.5 | — |
| 16 | 0 | −175 | −150 | −125 | −25 | −100 | −50 | −200 | −137.5 | −162.5 | −187.5 | −12.5 | −75 | −112.5 | −37.5 | −62.5 |

CSD values yielding performances similar to those from the CSD table above may be considered additionally.

The optimal CSD value of the 9th transmit chain that may be obtained from the metric of the criterion 3) is −137.5 ns.

When the 9th CSD value is determined as −137.5 ns, the optimal CSD value of the 10th transmit chain that may be obtained according to the criterion above is −162.5 ns.

When the 9th and 10th CSD values are determined as above, the optimal CSD value of the 11th transmit chain is obtained as −187.5 ns.

When the 9th, 10th, and 11th CSD values are determined as above, the optimal CSD value of the 12th transmit chain is obtained as −12.5 ns.

When the 9th, 10th, 11th, and 12th CSD values are determined as above, the optimal CSD value of the 13th transmit chain is obtained as −75 ns.

When the 9th, 10th, 11th, 12th, and 13th CSD values are determined as above, the optimal CSD value of the 15th transmit chain is obtained as −112.5 ns.

When the 9th, 10th, 11th, 12th, 13th, and 14th CSD values are determined as above, the optimal CSD value of the 15th transmit chain is obtained as −87.5 ns.

When the 9th, 10th, 11th, 12th, 13th, 14th, and 15th CSD values are determined as above, the optimal CSD value of the 16th transmit chain is obtained as −37.5 ns.

A CSD table according to a total number of transmit chains is shown below. The table shows optimal CSD values of the 9th to 16th transmit chains obtained according to the criterion 3).

c) Channel D

The optimal CSD value of the 9th transmit chain that may be obtained from the metric of the criterion 3) is −37.5 ns.

When the 9th CSD value is determined as −37.5 ns, the optimal CSD value of the 10th transmit chain that may be obtained according to the criterion above is −62.5 ns.

When the 9th and 10th CSD values are determined as above, the optimal CSD value of the 11th transmit chain is obtained as −112.5 ns.

When the 9th, 10th, and 11th CSD values are determined as above, the optimal CSD value of the 12th transmit chain is obtained as −12.5 ns.

When the 9th, 10th, 11th, and 12th CSD values are determined as above, the optimal CSD value of the 13th transmit chain is obtained as −75 ns.

When the 9th, 10th, 11th, 12th, and 13th CSD values are determined as above, the optimal CSD value of the 15th transmit chain is obtained as −87.5 ns.

When the 9th, 10th, 11th, 12th, 13th, and 14th CSD values are determined as above, the optimal CSD value of the 15th transmit chain is obtained as −162.5 ns.

When the 9th, 10th, 11th, 12th, 13th, 14th, and 15th CSD values are determined as above, the optimal CSD value of the 16th transmit chain is obtained as −137.5 ns.

A CSD table according to a total number of transmit chains is shown below. The table shows optimal CSD values of the 9th to 16th transmit chains obtained according to the criterion 3).

TABLE 24

| Total number of transmit chains per frequency segment | Cyclic Shift for transmit chains $i_{TX}$ (in unit of ns) | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 9  | 0 | −175 | −150 | −125 | −25 | −100 | −50 | −200 | −137.5 | — | — | — | — | — | — | — |
| 10 | 0 | −175 | −150 | −125 | −25 | −100 | −50 | −200 | −137.5 | −162.5 | — | — | — | — | — | — |
| 11 | 0 | −175 | −150 | −125 | −25 | −100 | −50 | −200 | −137.5 | −162.5 | −187.5 | — | — | — | — | — |
| 12 | 0 | −175 | −150 | −125 | −25 | −100 | −50 | −200 | −137.5 | −162.5 | −187.5 | −12.5 | — | — | — | — |
| 13 | 0 | −175 | −150 | −125 | −25 | −100 | −50 | −200 | −137.5 | −162.5 | −187.5 | −12.5 | −75 | — | — | — |
| 14 | 0 | −175 | −150 | −125 | −25 | −100 | −50 | −200 | −137.5 | −162.5 | −187.5 | −12.5 | −75 | −112.5 | — | — |
| 15 | 0 | −175 | −150 | −125 | −25 | −100 | −50 | −200 | −137.5 | −162.5 | −187.5 | −12.5 | −75 | −112.5 | −87.5 | — |
| 16 | 0 | −175 | −150 | −125 | −25 | −100 | −50 | −200 | −137.5 | −162.5 | −187.5 | −12.5 | −75 | −112.5 | −87.5 | −37.5 |

TABLE 25

| Total number of transmit chains per frequency segment | Cyclic Shift for transmit chains $i_{TX}$ (in unit of ns) | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 9 | 0 | −175 | −150 | −125 | −25 | −100 | −50 | −200 | −37.5 | — | — | — | — | — | — | — |
| 10 | 0 | −175 | −150 | −125 | −25 | −100 | −50 | −200 | −37.5 | −62.5 | — | — | — | — | — | — |
| 11 | 0 | −175 | −150 | −125 | −25 | −100 | −50 | −200 | −37.5 | −62.5 | −112.5 | — | — | — | — | — |
| 12 | 0 | −175 | −150 | −125 | −25 | −100 | −50 | −200 | −37.5 | −62.5 | −112.5 | −12.5 | — | — | — | — |
| 13 | 0 | −175 | −150 | −125 | −25 | −100 | −50 | −200 | −37.5 | −62.5 | −112.5 | −12.5 | −75 | — | — | — |
| 14 | 0 | −175 | −150 | −125 | −25 | −100 | −50 | −200 | −37.5 | −62.5 | −112.5 | −12.5 | −75 | −87.5 | — | — |
| 15 | 0 | −175 | −150 | −125 | −25 | −100 | −50 | −200 | −37.5 | −62.5 | −112.5 | −12.5 | −75 | −87.5 | −162.5 | — |
| 16 | 0 | −175 | −150 | −125 | −25 | −100 | −50 | −200 | −37.5 | −62.5 | −112.5 | −12.5 | −75 | −87.5 | −162.5 | −137.5 | d) Channel E

The optimal CSD value of the 9th transmit chain that may be obtained from the metric of the criterion 3) is −137.5 ns.

When the 9th CSD value is determined as −137.5 ns, the optimal CSD value of the 10th transmit chain that may be obtained according to the criterion above is −162.5 ns.

When the 9th and 10th CSD values are determined as above, the optimal CSD value of the 11th transmit chain is obtained as −37.5 ns.

When the 9th, 10th, and 11th CSD values are determined as above, the optimal CSD value of the 12th transmit chain is obtained as −112.5 ns.

When the 9th, 10th, 11th, and 12th CSD values are determined as above, the optimal CSD value of the 13th transmit chain is obtained as −87.5 ns.

When the 9th, 10th, 11th, 12th, and 13th CSD values are determined as above, the optimal CSD value of the 15th transmit chain is obtained as −187.5 ns.

When the 9th, 10th, 11th, 12th, 13th, and 14th CSD values are determined as above, the optimal CSD value of the 15th transmit chain is obtained as −12.5 ns.

When the 9th, 10th, 11th, 12th, 13th, 14th, and 15th CSD values are determined as above, the optimal CSD value of the 16th transmit chain is obtained as −75 ns.

A CSD table according to a total number of transmit chains is shown below. The table shows optimal CSD values of the 9th to 16th transmit chains obtained according to the criterion 3).

In what follows, referring to FIGS. 13 to 17, the embodiments above will be described.

Figure 18:
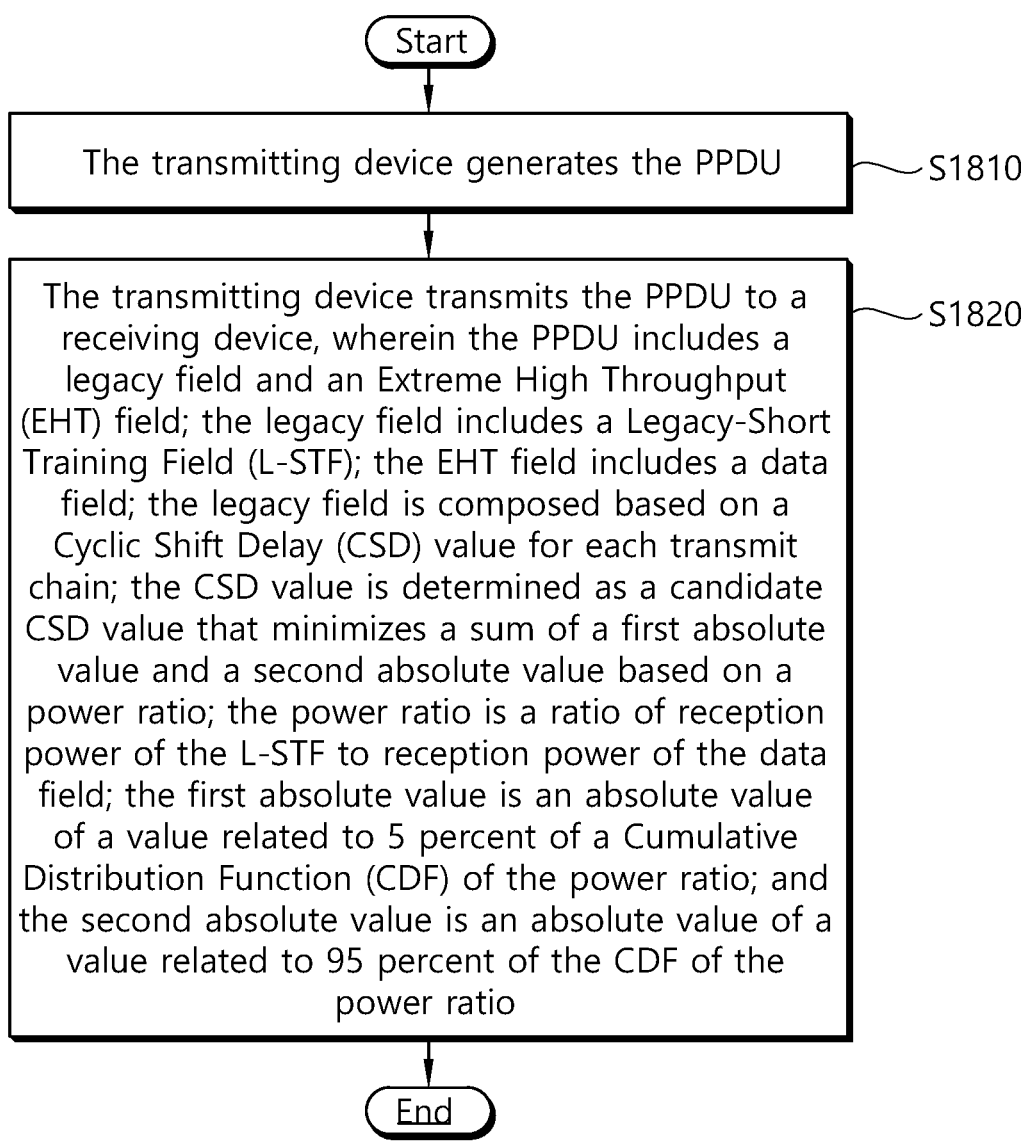
FIG. 18 is a flow diagram illustrating a procedure for transmitting a PPDU according to the present embodiment.

FIG. 18 is a flow diagram illustrating a procedure for transmitting a PPDU according to the present embodiment.

One example of FIG. 18 may be performed in a network environment supporting the next-generation WLAN system. The next-generation WLAN system is a WLAN system that is an improved 802.11ax system and may satisfy backward compatibility with the 802.11ax system. The next-generation WLAN system may correspond to the Extreme High Throughput (EHT) WLAN system or 802.11be WLAN system.

The present embodiment may be performed by a transmitting device, where the transmitting device may correspond to an AP. A receiving device may correspond to a non-AP STA.

To prevent unintended beamforming, the present embodiment proposes a method and a device for transmitting a PPDU by applying CSD for each transmission chain (or space-time stream). According to the method and the device, a difference between reception powers of the L-STF and data fields of the PPDU may be minimized, and efficient transmission supporting backward compatibility may be performed.

In the S1810 step, the transmitting device generates a Physical Protocol Data Unit (PPDU).

In the S1820 step, the transmitting device transmits the PPDU to a receiving device.

The PPDU includes a legacy field and an Extreme High Throughput (EHT) field. The legacy field includes a Legacy-Short Training Field (L-STF), and the EHT field includes a data field. More specifically, the legacy field includes fields

TABLE 26

| Total number of transmit chains per frequency segment | Cyclic Shift for transmit chains $i_{TX}$ (in unit of ns) | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 9 | 0 | −175 | −150 | −125 | −25 | −100 | −50 | −200 | −137.5 | — | — | — | — | — | — | — |
| 10 | 0 | −175 | −150 | −125 | −25 | −100 | −50 | −200 | −137.5 | −162.5 | — | — | — | — | — | — |
| 11 | 0 | −175 | −150 | −125 | −25 | −100 | −50 | −200 | −137.5 | −162.5 | −37.5 | — | — | — | — | — |
| 12 | 0 | −175 | −150 | −125 | −25 | −100 | −50 | −200 | −137.5 | −162.5 | −37.5 | −112.5 | — | — | — | — |
| 13 | 0 | −175 | −150 | −125 | −25 | −100 | −50 | −200 | −137.5 | −162.5 | −37.5 | −112.5 | −87.5 | — | — | — |
| 14 | 0 | −175 | −150 | −125 | −25 | −100 | −50 | −200 | −137.5 | −162.5 | −37.5 | −112.5 | −87.5 | −187.5 | — | — |
| 15 | 0 | −175 | −150 | −125 | −25 | −100 | −50 | −200 | −137.5 | −162.5 | −37.5 | −112.5 | −87.5 | −187.5 | −12.5 | — |
| 16 | 0 | −175 | −150 | −125 | −25 | −100 | −50 | −200 | −137.5 | −162.5 | −37.5 | −112.5 | −87.5 | −187.5 | −12.5 | −75 |

(from the L-STF) up to the EHT-SIG-A, and the EHT field includes fields from EHT-STF to the data fields. The legacy field may be a field supported by a WLAN system compliant with the pre-802.11be, and the EHT field may be a field supported by the 802.11be WLAN system.

The legacy field is composed based on a Cyclic Shift Delay (CSD) value for each transmit chain. In the 802.11be WLAN system, the transmitting device and the receiving device may support up to 16 transmit chains. In other words, the present embodiment proposes a method for determining a CSD value that may be applied to each transmit chain of the legacy field to prevent unintended beamforming.

Since a legacy WLAN system supports only up to 8 transmit chains, when the total number of transmit chains ranges from 9 to 16, the CSD value is not defined. The present embodiment proposes a method for defining a CSD value for 9 to 16 transmit chains additionally supported in the 802.11be WLAN system based on the CSD value intended up to 8 transmit chains.

A criterion (or a metric) for determining the CSD value is as follows.

As one example, the CSD value may be determined so that a sum of the absolute value of a value related to 5 percent of a CDF and the absolute value of a value related to 95 percent of the CDF is minimized. More specifically, the CSD value is determined as a candidate CSD value that minimizes a sum of a first absolute value and a second absolute value based on a power ratio.

The power ratio is a ratio of reception power of the L-STF to the reception power of the data field. In other words, the CSD value may be determined in such a way to minimize a difference between reception powers of the L-STF and data fields.

The first absolute value is the absolute value of a value related to 5 percent of a Cumulative Distribution Function (CDF) of the power ratio. The second absolute value is the absolute value of a value related to 95 percent of the CDF of the power ratio.

As another example, the CSD value may be determined so that the proportion of the ratio of the reception power of the L-STF to the reception power of the data field being distributed within a range from −1 dB to 1 dB is maximized.

As yet another example, the CSD value may be determined so that the proportion of the ratio of the reception power of the L-STF to the reception power of the data field being distributed within a range from −1.5 dB to 1.5 dB is maximized.

The candidate CSD values for 16 transmit chains may be determined by values within 200 ns to satisfy backward compatibility with legacy devices. Since a candidate CSD value for up to 8 transmit chains may not be used anymore in the legacy WLAN system, the present embodiment may use the remaining candidate CSD values other than the candidate CSD value used in the legacy WLAN system. The candidate CSD values may be −12.5 ns, −37.5 ns −62.5 ns, −75 ns, −87.5 ns, −112.5 ns, −137.5 ns, −167.5 ns, and −187.5 ns.

It should be noted, however, that descriptions given below are related only to the first embodiment (the case in which the CSD value is determined so as to minimize a sum of the absolute value of a value related to 5 percent of a CDF and the absolute value of a value related to 95 percent of the CDF).

Also, the CSD value may be determined by considering a Task Group (TGn) channel model. The TGn channel model is defined in the WLAN system, and descriptions of the present embodiment may be limited only to the channel model D and the channel mode E.

First, the CSD value may be determined based on the channel mode D. The channel model D may be a channel model considering the Line-Of-Sight (LOS) condition and delay diffusion in an indoor environment.

The CSD values for 9 to 16 transmit chains additionally supported may be defined based on the channel model D as follows.

When the total number of transmit chains is 9, the CSD value for the 9th transmit chain may be determined as −12.5 ns.

When the total number of transmit chains is 10, the CSD value for the 10th transmit chain may be determined as −62.5 ns based on the CSD value for the 9th transmit chain.

When the total number of transmit chains is 11, the CSD value for the 11th transmit chain may be determined as −162.5 ns based on the CSD values for the 9th and 10th transmit chains.

When the total number of transmit chains is 12, the CSD value for the 12th transmit chain may be determined as −37.5 ns based on the CSD values for the 9th to 11th transmit chains.

When the total number of transmit chains is 13, the CSD value for the 13th transmit chain may be determined as −112.5 ns based on the CSD values for the 9th to 12th transmit chains.

When the total number of transmit chains is 14, the CSD value for the 14th transmit chain may be determined as −187.5 ns based on the CSD values for the 9th to 13th transmit chains.

When the total number of transmit chains is 15, the CSD value for the 15th transmit chain may be determined as −75 ns based on the CSD values for the 9th to 14th transmit chains.

When the total number of transmit chains is 16, the CSD value for the 16th transmit chain may be determined as −87.5 ns based on the CSD values for the 9th to 15th transmit chains.

As in the embodiment described above, since the CSD value employs a nested structure, the transmitting device may determine additionally supported CSD values by considering all of the CSD values proposed for the existing transmit chains. Therefore, the CSD values for the 1st to 8th transmit chains may be the same as the CSD values defined for the legacy field. At this time, the legacy field may further include the Legacy-Long Training Field (L-LTF), Legacy-Signal (L-SIG), and Very High Throughput-Signal-A (VHT-SIG-A). In other words, the CSD values for the 1st to the 8th transmit chains may use the same CSD values defined for the pre-VHT modulated fields.

Also, the CSD value may be determined based on the channel model E. The channel model E may be a channel model considering the Non-Line-Of-Sight (NLOS) condition and delay diffusion in an indoor and outdoor environments.

The CSD values for 9 to 16 transmit chains additionally supported may be defined based on the channel model E as follows.

When the total number of transmit chains is 9, the CSD value for the 9th transmit chain may be determined as −37.5 ns.

When the total number of transmit chains is 10, the CSD value for the 10th transmit chain may be determined as −187.5 ns based on the CSD value for the 9th transmit chain.

When the total number of transmit chains is 11, the CSD value for the 11th transmit chain may be determined as −137.5 ns based on the CSD values for the 9th and 10th transmit chains.

When the total number of transmit chains is 12, the CSD value for the 12th transmit chain may be determined as −12.5 ns based on the CSD values for the 9th to 11th transmit chains.

When the total number of transmit chains is 13, the CSD value for the 13th transmit chain may be determined as −75 ns based on the CSD values for the 9th to 12th transmit chains.

When the total number of transmit chains is 14, the CSD value for the 14th transmit chain may be determined as −62.5 ns based on the CSD values for the 9th to 13th transmit chains.

When the total number of transmit chains is 15, the CSD value for the 15th transmit chain may be determined as −87.5 ns based on the CSD values for the 9th to 14th transmit chains.

When the total number of transmit chains is 16, the CSD value for the 16th transmit chain may be determined as −162.5 ns based on the CSD values for the 9th to 15th transmit chains.

In the same way, since the CSD value employs a nested structure, the transmitting device may determine additionally supported CSD values by considering all of the CSD values proposed for the existing transmit chains. Therefore, the CSD values for the 1st to 8th transmit chains may be the same as the CSD values defined for the legacy field. At this time, the legacy field may further include the Legacy-Long Training Field (L-LTF), Legacy-Signal (L-SIG), and Very High Throughput-Signal-A (VHT-SIG-A). In other words, the CSD values for the 1st to the 8th transmit chains may use the same CSD values defined for the pre-VHT modulated fields.

Figure 19:
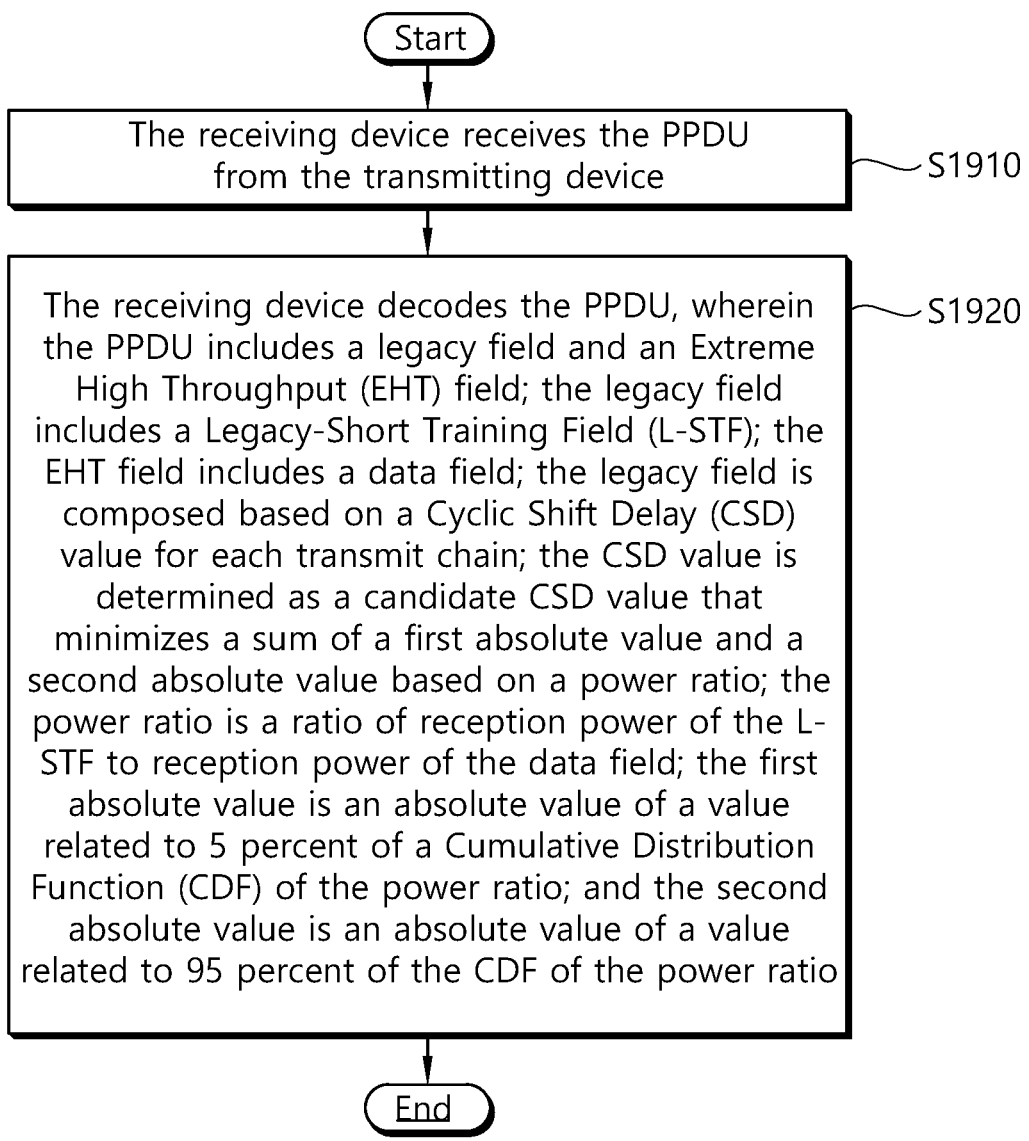
FIG. 19 is a flow diagram illustrating a procedure for receiving a PPDU according to the present embodiment.

FIG. 19 is a flow diagram illustrating a procedure for receiving a PPDU according to the present embodiment.

One example of FIG. 19 may be performed in a network environment supporting the next-generation WLAN system. The next-generation WLAN system is a WLAN system that is an improved 802.11ax system and may satisfy backward compatibility with the 802.11ax system. The next-generation WLAN system may correspond to the Extreme High Throughput (EHT) WLAN system or 802.11be WLAN system.

One example of FIG. 19 may be performed by a receiving device, where the receiving device may correspond to a non-AP STA. A transmitting device may correspond to an AP.

To prevent unintended beamforming, the present embodiment proposes a method and a device for transmitting a PPDU by applying CSD for each transmission chain (or space-time stream). According to the method and the device, a difference between reception powers of the L-STF and data fields of the PPDU may be minimized, and efficient transmission supporting backward compatibility may be performed.

In the S1910 step, the receiving device receives the PPDU from the transmitting device.

In the S1920 step, the receiving device decodes the PPDU.

The PPDU includes a legacy field and an Extreme High Throughput (EHT) field. The legacy field includes a Legacy-Short Training Field (L-STF), and the EHT field includes a data field. More specifically, the legacy field includes fields (from the L-STF) up to the EHT-SIG-A, and the EHT field includes fields from EHT-STF to the data fields. The legacy field may be a field supported by a WLAN system compliant with the pre-802.11be, and the EHT field may be a field supported by the 802.11be WLAN system.

The legacy field is composed based on a Cyclic Shift Delay (CSD) value for each transmit chain. In the 802.11be WLAN system, the transmitting device and the receiving device may support up to 16 transmit chains. In other words, the present embodiment proposes a method for determining a CSD value that may be applied to each transmit chain of the legacy field to prevent unintended beamforming.

Since a legacy WLAN system supports only up to 8 transmit chains, when the total number of transmit chains ranges from 9 to 16, the CSD value is not defined. The present embodiment proposes a method for defining a CSD value for 9 to 16 transmit chains additionally supported in the 802.11be WLAN system based on the CSD value intended up to 8 transmit chains.

A criterion (or a metric) for determining the CSD value is as follows.

As one example, the CSD value may be determined so that a sum of the absolute value of a value related to 5 percent of a CDF and the absolute value of a value related to 95 percent of the CDF is minimized. More specifically, the CSD value is determined as a candidate CSD value that minimizes a sum of a first absolute value and a second absolute value based on a power ratio.

The power ratio is a ratio of reception power of the L-STF to the reception power of the data field. In other words, the CSD value may be determined in such a way to minimize a difference between reception powers of the L-STF and data fields.

The first absolute value is the absolute value of a value related to 5 percent of a Cumulative Distribution Function (CDF) of the power ratio. The second absolute value is the absolute value of a value related to 95 percent of the CDF of the power ratio.

As another example, the CSD value may be determined so that the proportion of the ratio of the reception power of the L-STF to the reception power of the data field being distributed within a range from −1 dB to 1 dB is maximized.

As yet another example, the CSD value may be determined so that the proportion of the ratio of the reception power of the L-STF to the reception power of the data field being distributed within a range from −1.5 dB to 1.5 dB is maximized.

The candidate CSD values for 16 transmit chains may be determined by values within 200 ns to satisfy backward compatibility with legacy devices. Since a candidate CSD value for up to 8 transmit chains may not be used anymore in the legacy WLAN system, the present embodiment may use the remaining candidate CSD values other than the candidate CSD value used in the legacy WLAN system. The candidate CSD values may be −12.5 ns, −37.5 ns −62.5 ns, −75 ns, −87.5 ns, −112.5 ns, −137.5 ns, −167.5 ns, and −187.5 ns.

It should be noted, however, that descriptions given below are related only to the first embodiment (the case in which the CSD value is determined so as to minimize a sum of the absolute value of a value related to 5 percent of a CDF and the absolute value of a value related to 95 percent of the CDF).

Also, the CSD value may be determined by considering a Task Group (TGn) channel model. The TGn channel model is defined in the WLAN system, and descriptions of the present embodiment may be limited only to the channel model D and the channel mode E.

First, the CSD value may be determined based on the channel mode D. The channel model D may be a channel model considering the Line-Of-Sight (LOS) condition and delay diffusion in an indoor environment.

The CSD values for 9 to 16 transmit chains additionally supported may be defined based on the channel model D as follows.

When the total number of transmit chains is 9, the CSD value for the 9th transmit chain may be determined as −12.5 ns.

When the total number of transmit chains is 10, the CSD value for the 10th transmit chain may be determined as −62.5 ns based on the CSD value for the 9th transmit chain.

When the total number of transmit chains is 11, the CSD value for the 11th transmit chain may be determined as −162.5 ns based on the CSD values for the 9th and 10th transmit chains.

When the total number of transmit chains is 12, the CSD value for the 12th transmit chain may be determined as −37.5 ns based on the CSD values for the 9th to 11th transmit chains.

When the total number of transmit chains is 13, the CSD value for the 13th transmit chain may be determined as −112.5 ns based on the CSD values for the 9th to 12th transmit chains.

When the total number of transmit chains is 14, the CSD value for the 14th transmit chain may be determined as −187.5 ns based on the CSD values for the 9th to 13th transmit chains.

When the total number of transmit chains is 15, the CSD value for the 15th transmit chain may be determined as −75 ns based on the CSD values for the 9th to 14th transmit chains.

When the total number of transmit chains is 16, the CSD value for the 16th transmit chain may be determined as −87.5 ns based on the CSD values for the 9th to 15th transmit chains.

As in the embodiment described above, since the CSD value employs a nested structure, the transmitting device may determine additionally supported CSD values by considering all of the CSD values proposed for the existing transmit chains. Therefore, the CSD values for the 1st to 8th transmit chains may be the same as the CSD values defined for the legacy field. At this time, the legacy field may further include the Legacy-Long Training Field (L-LTF), Legacy-Signal (L-SIG), and Very High Throughput-Signal-A (VHT-SIG-A). In other words, the CSD values for the 1st to the 8th transmit chains may use the same CSD values defined for the pre-VHT modulated fields.

Also, the CSD value may be determined based on the channel model E. The channel model E may be a channel model considering the Non-Line-Of-Sight (NLOS) condition and delay diffusion in an indoor and outdoor environments.

The CSD values for 9 to 16 transmit chains additionally supported may be defined based on the channel model E as follows.

When the total number of transmit chains is 9, the CSD value for the 9th transmit chain may be determined as −37.5 ns.

When the total number of transmit chains is 10, the CSD value for the 10th transmit chain may be determined as −187.5 ns based on the CSD value for the 9th transmit chain.

When the total number of transmit chains is 11, the CSD value for the 11th transmit chain may be determined as −137.5 ns based on the CSD values for the 9th and 10th transmit chains.

When the total number of transmit chains is 12, the CSD value for the 12th transmit chain may be determined as −12.5 ns based on the CSD values for the 9th to 11th transmit chains.

When the total number of transmit chains is 13, the CSD value for the 13th transmit chain may be determined as −75 ns based on the CSD values for the 9th to 12th transmit chains.

When the total number of transmit chains is 14, the CSD value for the 14th transmit chain may be determined as −62.5 ns based on the CSD values for the 9th to 13th transmit chains.

When the total number of transmit chains is 15, the CSD value for the 15th transmit chain may be determined as −87.5 ns based on the CSD values for the 9th to 14th transmit chains.

When the total number of transmit chains is 16, the CSD value for the 16th transmit chain may be determined as −162.5 ns based on the CSD values for the 9th to 15th transmit chains.

In the same way, since the CSD value employs a nested structure, the transmitting device may determine additionally supported CSD values by considering all of the CSD values proposed for the existing transmit chains. Therefore, the CSD values for the 1st to 8th transmit chains may be the same as the CSD values defined for the legacy field. At this time, the legacy field may further include the Legacy-Long Training Field (L-LTF), Legacy-Signal (L-SIG), and Very High Throughput-Signal-A (VHT-SIG-A). In other words, the CSD values for the 1st to the 8th transmit chains may use the same CSD values defined for the pre-VHT modulated fields.

5. Composition of Device

Figure 20:
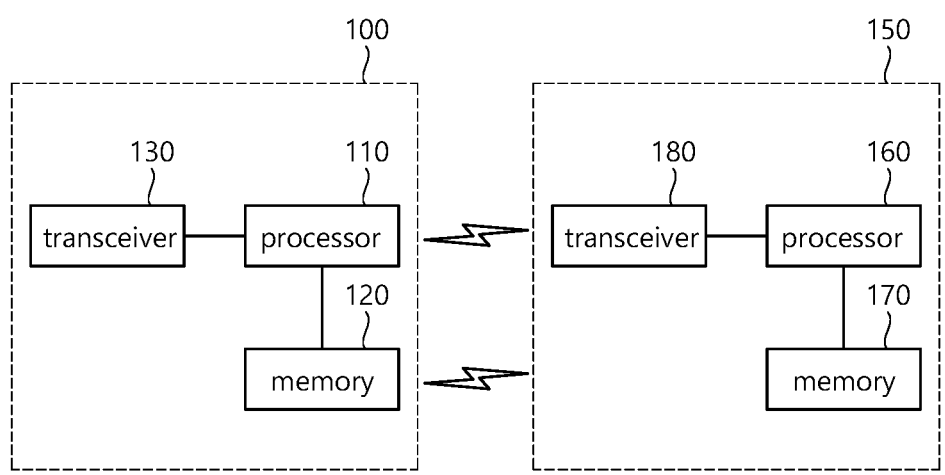
FIG. 20 is a diagram for describing a device for implementing the above-described method.

FIG. 20 is a diagram for describing a device for implementing the above-described method.

The wireless device 100 of FIG. 20 may be a transmitting device in which the embodiment described above may be implemented and may operate as an AP STA. The wireless device 150 of FIG. 20 may be a receiving device in which the embodiment described above may be implemented and may operate as a non-AP STA.

The transmitting device (100) may include a processor (110), a memory (120), and a transceiver (130), and the receiving device (150) may include a processor (160), a memory (170), and a transmitting/receiving unit (180). The transceiver (130, 180) transmits/receives a radio signal and may be operated in a physical layer of IEEE 802.11/3GPP, and so on. The processor (110, 160) may be operated in the physical layer and/or MAC layer and may be operatively connected to the transceiver (130, 180).

The processor (110, 160) and/or transceiver (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor 110, 160 may implement the functions, processes and/or methods proposed in the present disclosure. For example, the processor 110, 160 may perform the operation according to the present embodiment.

The operation of the processor 110 in the transmitting device is as follows. The processor 110 of the transmitting device generates a PPDU and transmits the PPDU.

The operation of the processor 160 in the receiving device is as follows. The processor 160 of the receiving device receives a generated PPDU from the transmitting device and decodes the PPDU with respect to the frequency band supported by the receiving device.

Figure 21:
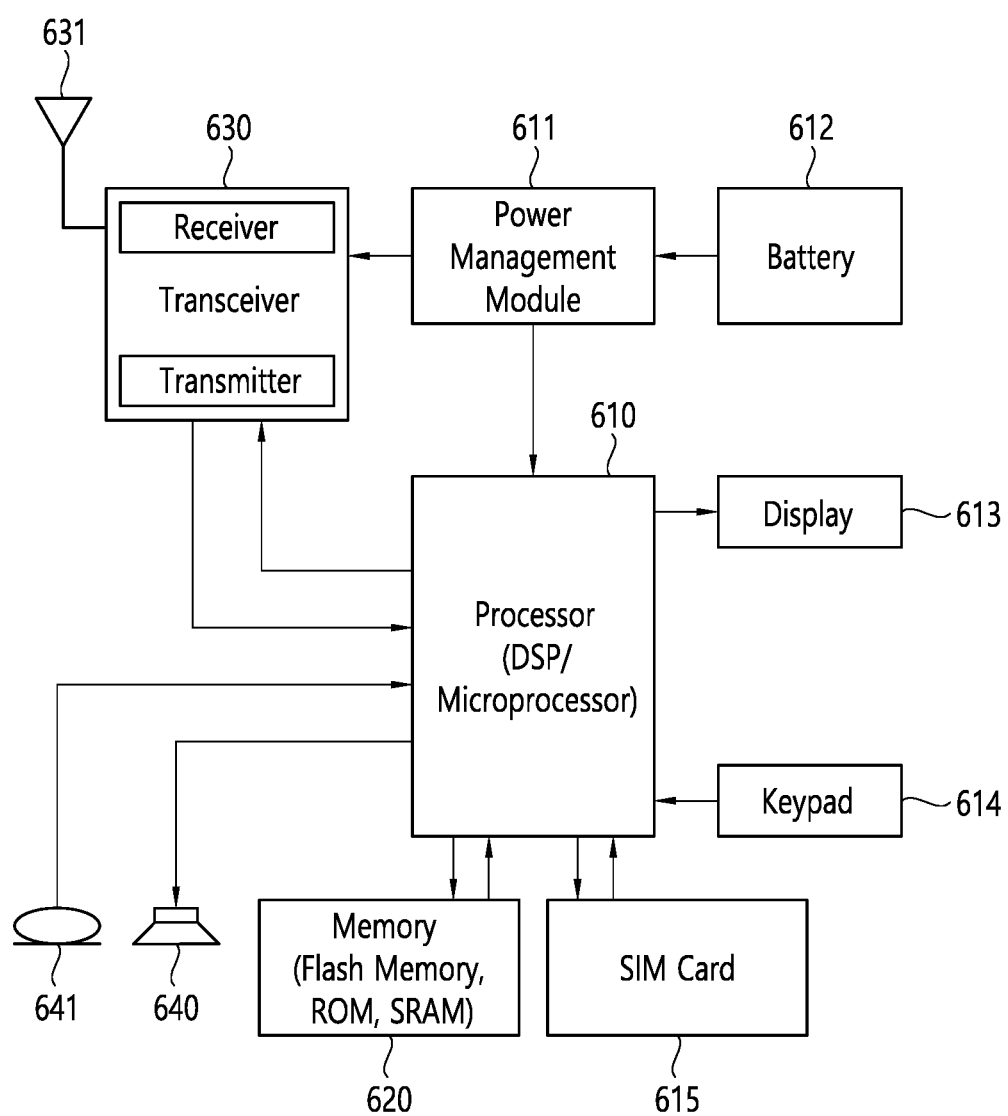
FIG. 21 illustrates a more detailed wireless device for implementing the embodiment of the present disclosure.

FIG. 21 shows a UE to which the technical features of the present disclosure can be applied.

A UE includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods of the present disclosure described below. The processor 610 may be configured to control one or more other components of the UE 600 to implement proposed functions, procedures and/or methods of the present disclosure described below. Layers of the radio interface protocol may be implemented in the processor 610. The processor 610 may include application-specific integrated circuit (ASIC), other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitting device and a receiving device. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

In the case of the transmitting device, the processor 610 generates a PPDU and transmits the PPDU.

In the case of the receiving device, the processor 610 receives a generated PPDU from the transmitting device and decodes the PPDU with respect to the frequency band supported by the receiving device.

The PPDU includes a legacy field and an Extreme High Throughput (EHT) field. The legacy field includes a Legacy-Short Training Field (L-STF), and the EHT field includes a data field. More specifically, the legacy field includes fields (from the L-STF) up to the EHT-SIG-A, and the EHT field includes fields from EHT-STF to the data fields. The legacy field may be a field supported by a WLAN system compliant with the pre-802.11be, and the EHT field may be a field supported by the 802.11be WLAN system.

The legacy field is composed based on a Cyclic Shift Delay (CSD) value for each transmit chain. In the 802.11be WLAN system, the transmitting device and the receiving device may support up to 16 transmit chains. In other words, the present embodiment proposes a method for determining a CSD value that may be applied to each transmit chain of the legacy field to prevent unintended beamforming.

Since a legacy WLAN system supports only up to 8 transmit chains, when the total number of transmit chains ranges from 9 to 16, the CSD value is not defined. The present embodiment proposes a method for defining a CSD value for 9 to 16 transmit chains additionally supported in the 802.11be WLAN system based on the CSD value intended up to 8 transmit chains.

A criterion (or a metric) for determining the CSD value is as follows.

As one example, the CSD value may be determined so that a sum of the absolute value of a value related to 5 percent of a CDF and the absolute value of a value related to 95 percent of the CDF is minimized. More specifically, the CSD value is determined as a candidate CSD value that minimizes a sum of a first absolute value and a second absolute value based on a power ratio.

The power ratio is a ratio of reception power of the L-STF to the reception power of the data field. In other words, the CSD value may be determined in such a way to minimize a difference between reception powers of the L-STF and data fields.

The first absolute value is the absolute value of a value related to 5 percent of a Cumulative Distribution Function (CDF) of the power ratio. The second absolute value is the absolute value of a value related to 95 percent of the CDF of the power ratio.

As another example, the CSD value may be determined so that the proportion of the ratio of the reception power of the L-STF to the reception power of the data field being distributed within a range from −1 dB to 1 dB is maximized.

As yet another example, the CSD value may be determined so that the proportion of the ratio of the reception power of the L-STF to the reception power of the data field being distributed within a range from −1.5 dB to 1.5 dB is maximized.

The candidate CSD values for 16 transmit chains may be determined by values within 200 ns to satisfy backward compatibility with legacy devices. Since a candidate CSD value for up to 8 transmit chains may not be used anymore in the legacy WLAN system, the present embodiment may use the remaining candidate CSD values other than the candidate CSD value used in the legacy WLAN system. The candidate CSD values may be −12.5 ns, −37.5 ns −62.5 ns, −75 ns, −87.5 ns, −112.5 ns, −137.5 ns, −167.5 ns, and −187.5 ns.

It should be noted, however, that descriptions given below are related only to the first embodiment (the case in which the CSD value is determined so as to minimize a sum of the absolute value of a value related to 5 percent of a CDF and the absolute value of a value related to 95 percent of the CDF).

Also, the CSD value may be determined by considering a Task Group (TGn) channel model. The TGn channel model is defined in the WLAN system, and descriptions of the present embodiment may be limited only to the channel model D and the channel mode E.

First, the CSD value may be determined based on the channel mode D. The channel model D may be a channel model considering the Line-Of-Sight (LOS) condition and delay diffusion in an indoor environment.

The CSD values for 9 to 16 transmit chains additionally supported may be defined based on the channel model D as follows.

When the total number of transmit chains is 9, the CSD value for the 9th transmit chain may be determined as −12.5 ns.

When the total number of transmit chains is 10, the CSD value for the 10th transmit chain may be determined as −62.5 ns based on the CSD value for the 9th transmit chain.

When the total number of transmit chains is 11, the CSD value for the 11th transmit chain may be determined as −162.5 ns based on the CSD values for the 9th and 10th transmit chains.

When the total number of transmit chains is 12, the CSD value for the 12th transmit chain may be determined as −37.5 ns based on the CSD values for the 9th to 11th transmit chains.

When the total number of transmit chains is 13, the CSD value for the 13th transmit chain may be determined as −112.5 ns based on the CSD values for the 9th to 12th transmit chains.

When the total number of transmit chains is 14, the CSD value for the 14th transmit chain may be determined as −187.5 ns based on the CSD values for the 9th to 13th transmit chains.

When the total number of transmit chains is 15, the CSD value for the 15th transmit chain may be determined as −75 ns based on the CSD values for the 9th to 14th transmit chains.

When the total number of transmit chains is 16, the CSD value for the 16th transmit chain may be determined as −87.5 ns based on the CSD values for the 9th to 15th transmit chains.

As in the embodiment described above, since the CSD value employs a nested structure, the transmitting device may determine additionally supported CSD values by considering all of the CSD values proposed for the existing transmit chains. Therefore, the CSD values for the 1st to 8th transmit chains may be the same as the CSD values defined for the legacy field. At this time, the legacy field may further include the Legacy-Long Training Field (L-LTF), Legacy-Signal (L-SIG), and Very High Throughput-Signal-A (VHT-SIG-A). In other words, the CSD values for the 1st to the 8th transmit chains may use the same CSD values defined for the pre-VHT modulated fields.

Also, the CSD value may be determined based on the channel model E. The channel model E may be a channel model considering the Non-Line-Of-Sight (NLOS) condition and delay diffusion in an indoor and outdoor environments.

The CSD values for 9 to 16 transmit chains additionally supported may be defined based on the channel model E as follows.

When the total number of transmit chains is 9, the CSD value for the 9th transmit chain may be determined as −37.5 ns.

When the total number of transmit chains is 10, the CSD value for the 10th transmit chain may be determined as −187.5 ns based on the CSD value for the 9th transmit chain.

When the total number of transmit chains is 11, the CSD value for the 11th transmit chain may be determined as −137.5 ns based on the CSD values for the 9th and 10th transmit chains.

When the total number of transmit chains is 12, the CSD value for the 12th transmit chain may be determined as −12.5 ns based on the CSD values for the 9th to 11th transmit chains.

When the total number of transmit chains is 13, the CSD value for the 13th transmit chain may be determined as −75 ns based on the CSD values for the 9th to 12th transmit chains.

When the total number of transmit chains is 14, the CSD value for the 14th transmit chain may be determined as −62.5 ns based on the CSD values for the 9th to 13th transmit chains.

When the total number of transmit chains is 15, the CSD value for the 15th transmit chain may be determined as −87.5 ns based on the CSD values for the 9th to 14th transmit chains.

When the total number of transmit chains is 16, the CSD value for the 16th transmit chain may be determined as −162.5 ns based on the CSD values for the 9th to 15th transmit chains.

In the same way, since the CSD value employs a nested structure, the transmitting device may determine additionally supported CSD values by considering all of the CSD values proposed for the existing transmit chains. Therefore, the CSD values for the 1st to 8th transmit chains may be the same as the CSD values defined for the legacy field. At this time, the legacy field may further include the Legacy-Long Training Field (L-LTF), Legacy-Signal (L-SIG), and Very High Throughput-Signal-A (VHT-SIG-A). In other words, the CSD values for the 1st to the 8th transmit chains may use the same CSD values defined for the pre-VHT modulated fields.

What is claimed is:

1. A method for transmitting a Physical Protocol Data Unit (PPDU) in a wireless LAN system, the method comprising:
generating, by a transmitting device, the PPDU; and
transmitting, by the transmitting device, the PPDU to a receiving device,
wherein the PPDU includes a legacy field and an Extreme High Throughput (EHT) field,
the legacy field includes a Legacy-Short Training Field (L-STF),
the EHT field includes a data field,
the legacy field is composed based on a Cyclic Shift Delay (CSD) value for each transmit chain, the CSD value is determined as a candidate CSD value that minimizes a sum of a first absolute value and a second absolute value based on a power ratio, the power ratio is a ratio of reception power of the L-STF to reception power of the data field, the first absolute value is an absolute value of a value related to 5 percent of a Cumulative Distribution Function (CDF) of the power ratio, and the second absolute value is an absolute value of a value related to 95 percent of the CDF of the power ratio.

2. The method of claim 1, wherein the candidate CSD values are −12.5 ns, −37.5 ns −62.5 ns, −75 ns, −87.5 ns, −112.5 ns, −137.5 ns, −167.5 ns, and −187.5 ns.

3. The method of claim 2, wherein the CSD value is determined based on a channel model D, and the channel model D is a channel model considering the Line-Of-Sight (LOS) condition and delay diffusion in an indoor environment.

4. The method of claim 3, wherein, when the total number of transmit chains is 9, a CSD value for the 9th transmit chain is determined as −12.5 ns;

when the total number of transmit chains is 10, a CSD value for the 10th transmit chain is determined as −62.5 ns based on the CSD value for the 9th transmit chain;

when the total number of transmit chains is 11, a CSD value for the 11th transmit chain is determined as −162.5 ns based on the CSD values for the 9th and 10th transmit chains;

when the total number of transmit chains is 12, a CSD value for the 12th transmit chain is determined as −37.5 ns based on the CSD values for the 9th to 11th transmit chains;

when the total number of transmit chains is 13, a CSD value for the 13th transmit chain is determined as −112.5 ns based on the CSD values for the 9th to 12th transmit chains;

when the total number of transmit chains is 14, a CSD value for the 14th transmit chain is determined as −187.5 ns based on the CSD values for the 9th to 13th transmit chains;

when the total number of transmit chains is 15, a CSD value for the 15th transmit chain is determined as −75 ns based on the CSD values for the 9th to 14th transmit chains; and when the total number of transmit chains is 16, a CSD value for the 16th transmit chain is determined as −87.5 ns based on the CSD values for the 9th to 15th transmit chains.

5. The method of claim 4, wherein CSD values for the 1st to 8th transmit chains are the same as the CSD values defined for the legacy field, and the legacy field further includes Legacy-Long Training Field (L-LTF), Legacy-Signal (L-SIG), and Very High Throughput-Signal-A (VHT-SIG-A).

6. The method of claim 2, wherein the CSD value is determined based on a channel model E, and the channel model E is a channel model considering the Non-Line-Of-Sight (NLOS) condition and delay diffusion in an indoor and outdoor environments.

7. The method of claim 6, wherein, when the total number of transmit chains is 9, a CSD value for the 9th transmit chain is determined as −37.5 ns;

when the total number of transmit chains is 10, a CSD value for the 10th transmit chain is determined as −187.5 ns based on the CSD value for the 9th transmit chain;

when the total number of transmit chains is 11, a CSD value for the 11th transmit chain is determined as −137.5 ns based on the CSD values for the 9th and 10th transmit chains;

when the total number of transmit chains is 12, a CSD value for the 12th transmit chain is determined as −12.5 ns based on the CSD values for the 9th to 11th transmit chains;

when the total number of transmit chains is 13, a CSD value for the 13th transmit chain is determined as −75 ns based on the CSD values for the 9th to 12th transmit chains;

when the total number of transmit chains is 14, a CSD value for the 14th transmit chain is determined as −62.5 ns based on the CSD values for the 9th to 13th transmit chains;

when the total number of transmit chains is 15, a CSD value for the 15th transmit chain is determined as −87.5 ns based on the CSD values for the 9th to 14th transmit chains; and when the total number of transmit chains is 16, a CSD value for the 16th transmit chain is determined as −162.5 ns based on the CSD values for the 9th to 15th transmit chains.

8. The method of claim 7, wherein CSD values for the 1st to 8th transmit chains are the same as the CSD values defined for the legacy field, and the legacy field further includes Legacy-Long Training Field (L-LTF), Legacy-Signal (L-SIG), and Very High Throughput-Signal-A (VHT-SIG-A).

9. A transmitting device transmitting a Physical Protocol Data Unit (PPDU) in a wireless LAN system, the transmitting device comprising:

a memory;

a transceiver; and a processor coupled operatively to the memory and the transceiver, wherein the processor is configured to:

generate the PPDU; and transmit the PPDU to a receiving device, wherein the PPDU includes a legacy field and an Extreme High Throughput (EHT) field, the legacy field includes a Legacy-Short Training Field (L-STF), the EHT field includes a data field, the legacy field is composed based on a Cyclic Shift Delay (CSD) value for each transmit chain, the CSD value is determined as a candidate CSD value that minimizes a sum of a first absolute value and a second absolute value based on a power ratio, the power ratio is a ratio of reception power of the L-STF to reception power of the data field, the first absolute value is an absolute value of a value related to 5 percent of a Cumulative Distribution Function (CDF) of the power ratio, and the second absolute value is an absolute value of a value related to 95 percent of the CDF of the power ratio.

10. The transmitting device of claim 9, wherein the candidate CSD values are −12.5 ns, −37.5 ns −62.5 ns, −75 ns, −87.5 ns, −112.5 ns, −137.5 ns, −167.5 ns, and −187.5 ns.

11. The transmitting device of claim 10, wherein the CSD value is determined based on a channel model D, and the channel model D is a channel model considering the Line-Of-Sight (LOS) condition and delay diffusion in an indoor environment.

12. The transmitting device of claim 11, wherein,
when the total number of transmit chains is 9, a CSD value for the 9th transmit chain is determined as −12.5 ns;
when the total number of transmit chains is 10, a CSD value for the 10th transmit chain is determined as −62.5 ns based on the CSD value for the 9th transmit chain;
when the total number of transmit chains is 11, a CSD value for the 11th transmit chain is determined as −162.5 ns based on the CSD values for the 9th and 10th transmit chains;
when the total number of transmit chains is 12, a CSD value for the 12th transmit chain is determined as −37.5 ns based on the CSD values for the 9th to 11th transmit chains;
when the total number of transmit chains is 13, a CSD value for the 13th transmit chain is determined as −112.5 ns based on the CSD values for the 9th to 12th transmit chains;
when the total number of transmit chains is 14, a CSD value for the 14th transmit chain is determined as −187.5 ns based on the CSD values for the 9th to 13th transmit chains;
when the total number of transmit chains is 15, a CSD value for the 15th transmit chain is determined as −75 ns based on the CSD values for the 9th to 14th transmit chains; and
when the total number of transmit chains is 16, a CSD value for the 16th transmit chain is determined as −87.5 ns based on the CSD values for the 9th to 15th transmit chains.

13. The transmitting device of claim 12, wherein CSD values for the 1st to 8th transmit chains are the same as the CSD values defined for the legacy field, and
the legacy field further includes Legacy-Long Training Field (L-LTF), Legacy-Signal (L-SIG), and Very High Throughput-Signal-A (VHT-SIG-A).

14. The transmitting device of claim 10, wherein the CSD value is determined based on a channel model E, and
the channel model E is a channel model considering the Non-Line-Of-Sight (NLOS) condition and delay diffusion in an indoor and outdoor environments.

15. The transmitting device of claim 14, wherein,
when the total number of transmit chains is 9, a CSD value for the 9th transmit chain is determined as −37.5 ns;
when the total number of transmit chains is 10, a CSD value for the 10th transmit chain is determined as −187.5 ns based on the CSD value for the 9th transmit chain;
when the total number of transmit chains is 11, a CSD value for the 11th transmit chain is determined as −137.5 ns based on the CSD values for the 9th and 10th transmit chains;
when the total number of transmit chains is 12, a CSD value for the 12th transmit chain is determined as −12.5 ns based on the CSD values for the 9th to 11th transmit chains;
when the total number of transmit chains is 13, a CSD value for the 13th transmit chain is determined as −75 ns based on the CSD values for the 9th to 12th transmit chains;
when the total number of transmit chains is 14, a CSD value for the 14th transmit chain is determined as −62.5 ns based on the CSD values for the 9th to 13th transmit chains;
when the total number of transmit chains is 15, a CSD value for the 15th transmit chain is determined as −87.5 ns based on the CSD values for the 9th to 14th transmit chains; and
when the total number of transmit chains is 16, a CSD value for the 16th transmit chain is determined as −162.5 ns based on the CSD values for the 9th to 15th transmit chains.

16. The transmitting device of claim 15, wherein CSD values for the 1st to 8th transmit chains are the same as the CSD values defined for the legacy field, and
the legacy field further includes Legacy-Long Training Field (L-LTF), Legacy-Signal (L-SIG), and Very High Throughput-Signal-A (VHT-SIG-A).

17. A method for receiving a Physical Protocol Data Unit (PPDU) in a wireless LAN system, the method comprising:
receiving, by a receiving device, a PPDU from a transmitting device; and
demodulating, by the receiving device, the PPDU,
wherein the PPDU includes a legacy field and an Extreme High Throughput (EHT) field,
the legacy field includes a Legacy-Short Training Field (L-STF),
the EHT field includes a data field,
the legacy field is composed based on a Cyclic Shift Delay (CSD) value for each transmit chain,
the CSD value is determined as a candidate CSD value that minimizes a sum of a first absolute value and a second absolute value based on a power ratio,
the power ratio is a ratio of reception power of the L-STF to reception power of the data field,
the first absolute value is an absolute value of a value related to 5 percent of a Cumulative Distribution Function (CDF) of the power ratio, and
the second absolute value is an absolute value of a value related to 95 percent of the CDF of the power ratio.

* * * * *